(12) United States Patent
Deng et al.

(10) Patent No.: US 11,420,741 B2
(45) Date of Patent: Aug. 23, 2022

(54) METHODS AND APPARATUSES RELATED TO TRANSFORMABLE REMOTE CONTROLLERS

(71) Applicant: SZ DJI TECHNOLOGY CO., LTD., Shenzhen (CN)

(72) Inventors: Yumian Deng, Shenzhen (CN); Bo Yuan, Shenzhen (CN); Lei Deng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 306 days.

(21) Appl. No.: 16/683,967

(22) Filed: Nov. 14, 2019

(65) Prior Publication Data

US 2020/0079507 A1 Mar. 12, 2020

Related U.S. Application Data

(63) Continuation of application No. PCT/CN2017/089312, filed on Jun. 21, 2017.

(51) Int. Cl.
*B64C 39/02* (2006.01)
*B64D 1/12* (2006.01)
(Continued)

(52) U.S. Cl.
CPC .............. *B64C 39/024* (2013.01); *B64D 1/12* (2013.01); *B64D 47/08* (2013.01); *G05D 1/0011* (2013.01);
(Continued)

(58) Field of Classification Search
CPC ........ A63F 13/235; A63F 13/26; A63F 13/98; A63F 13/24; B64C 39/024;
(Continued)

(56) References Cited

U.S. PATENT DOCUMENTS 6,664,946 B1 * 12/2003 Stipes ................... G06F 3/0354
345/157
8,226,484 B2 * 7/2012 Bryant .................. A63F 13/285
463/36
(Continued)

FOREIGN PATENT DOCUMENTS

CN 2469484 Y 1/2002
CN 1549581 A 11/2004
(Continued)

OTHER PUBLICATIONS

The World Intellectual Property Organization (WIPO) International Search Report for PCT/CN2017/089312 dated Mar. 21, 2018 6 pages.

*Primary Examiner* — Benjamin P Lee
(74) *Attorney, Agent, or Firm* — Anova Law Group, PLLC

(57) ABSTRACT

A remote controller for operating an unmanned aerial vehicle (UAV) includes a user input component configured to receive user input from a user and a communication circuit configured to transmit an instruction to operate at least one of the UAV or a load carried by the UAV based on the user input. The remote controller is configured to transform between (1) a single-hand operation mode that enables the user to control an operation of the at least one of the UAV or the load using the user input from a single hand while being held by the single hand, and (2) a multi-hand operation mode that enables the user to control the operation of the at least one of the UAV or the load using at least two hands while holding the remote controller using the at least two hands.

20 Claims, 13 Drawing Sheets

(51) Int. Cl.
*B64D 47/08* (2006.01)
*G05D 1/00* (2006.01)
*G08G 5/00* (2006.01)

(52) U.S. Cl.
CPC ...... *G08G 5/0069* (2013.01); *B64C 2201/027* (2013.01); *B64C 2201/141* (2013.01); *B64C 2201/146* (2013.01)

(58) Field of Classification Search
CPC ........ B64C 2201/027; B64C 2201/146; B64D 1/12; G05D 1/0011; G08G 5/0069
See application file for complete search history.

(56) References Cited

U.S. PATENT DOCUMENTS

| | | | |
|---|---|---|---|
| 8,323,106 B2* | 12/2012 | Zalewski | A63F 13/06 463/31 |
| 8,456,284 B2* | 6/2013 | Rigazio | G08C 17/00 345/169 |
| 10,133,271 B2* | 11/2018 | Hutson | B64C 39/024 |
| 10,152,052 B1* | 12/2018 | Lu | G06F 3/017 |
| 10,194,541 B2* | 1/2019 | Deng | H05K 5/0017 |
| 10,284,693 B2* | 5/2019 | Deng | A63F 13/24 |
| 10,301,009 B2* | 5/2019 | Roop | B64C 27/20 |
| 10,616,385 B2* | 4/2020 | Deng | A63F 13/26 |
| 11,037,437 B2* | 6/2021 | He | G05G 1/06 |
| 11,102,338 B2* | 8/2021 | Deng | H04M 1/0247 |
| 2007/0066394 A1* | 3/2007 | Ikeda | A63F 13/24 463/37 |
| 2010/0302359 A1 | 12/2010 | Adams et al. | |
| 2012/0083945 A1 | 4/2012 | Oakley et al. | |
| 2014/0364232 A1* | 12/2014 | Cramer | A63F 13/98 463/37 |
| 2016/0070264 A1 | 3/2016 | Hu et al. | |
| 2017/0277176 A1* | 9/2017 | Hutson | G06F 3/011 |
| 2018/0161670 A1* | 6/2018 | Boev | A63F 13/24 |
| 2018/0375977 A1* | 12/2018 | Deng | A63H 30/04 |
| 2019/0199046 A1* | 6/2019 | Yuan | F16B 2/12 |
| 2020/0079507 A1* | 3/2020 | Deng | B64D 47/08 |
| 2020/0183381 A1* | 6/2020 | Deng | G08C 17/02 |
| 2020/0272141 A1* | 8/2020 | Chung | G05D 1/102 |
| 2020/0333823 A1* | 10/2020 | Liang | G05G 25/04 |
| 2021/0141425 A1* | 5/2021 | Kim | G06F 1/1698 |
| 2021/0325866 A1* | 10/2021 | Chan | G08C 17/02 |

FOREIGN PATENT DOCUMENTS

| | | |
|---|---|---|
| CN | 2812159 Y | 8/2006 |
| CN | 101197075 A | 6/2008 |
| CN | 101236431 A | 8/2008 |
| CN | 102880285 A | 1/2013 |
| CN | 102986244 A | 3/2013 |
| CN | 103197864 A | 7/2013 |
| CN | 103426282 A | 12/2013 |
| CN | 104349198 A | 2/2015 |
| CN | 104598108 A | 5/2015 |
| CN | 104797995 A | 7/2015 |
| CN | 105517666 A | 4/2016 |
| CN | 105678989 A | 6/2016 |
| CN | 205541399 U | 8/2016 |
| CN | 205665860 U | 10/2016 |
| CN | 205920057 U | 2/2017 |
| CN | 106714922 A | 5/2017 |
| CN | 206175991 U | 5/2017 |
| EP | 3103532 A2 | 12/2016 |
| EP | 3103532 A3 | 3/2017 |

\* cited by examiner

METHODS AND APPARATUSES RELATED TO TRANSFORMABLE REMOTE CONTROLLERS

CROSS-REFERENCE TO RELATED APPLICATION

This application is a continuation of International Application No. PCT/CN2017/089312, filed Jun. 21, 2017, the entire content of which is incorporated herein by reference.

BACKGROUND

An unmanned vehicle such as an unmanned aerial vehicle (UAV) can be used for various applications, such as performing surveillance, reconnaissance, and exploration tasks in a wide variety of environments for military and civilian applications. The UAV may carry one or more loads while performing the various tasks, for example a payload and/or a payload carrier for coupling the payload to the UAV (e.g., a gimbal). The payload may be used to aid completion of the various tasks.

A remote controller can be used for controlled operation of the UAV, payload and/or payload carrier. The remote controller can enable a user to engage in ongoing control and/or monitoring of the operations of the UAV and/or one or more loads carried by the UAV from a location remote from the UAV, including from a location at which the UAV is outside of a field of view of the user. The remote controller may enable a user to view various parameters relating to the operations of the UAV and/or the one or more loads, such that in response, the user can interact with the remote controller to change one or more operation parameters of the UAV and/or the one or more loads.

SUMMARY

Methods and apparatuses described herein relate to a transformable remote controller configured to transform between a single-hand operation mode and a multi-hand operation mode. The transformable remote controller can be used to control operations of a movable object, such as an aerial vehicle, including an unmanned aerial vehicle (UAV), and/or one or more loads carried by the movable object. In the single-hand operation mode, the transformable remote controller can be configured to be held by a user using a single hand while enabling the user to use the transformable remote controller to provide desired control of the UAV, and/or one or more loads carried by the UAV, leaving the user's other hand free for other activities. For example, the user can use the transformable remote controller to control operations of the UAV and/or one or more loads carried by the UAV when the user desires to be mobile, such that the other hand of the user can be used for balancing, and/or control of a vehicle. In the multi-hand operation mode, the transformable remote controller can be configured to be held by two hands of the user to provide desired control of the UAV and/or one or more loads carried by the UAV. The single-hand operation mode may comprise a more compact configuration than that of the multi-hand operation mode to facilitate gripping of the transformable remote controller in one hand.

In one aspect, a remote controller for operating an unmanned aerial vehicle (UAV) can comprise: a user input component configured to receive user input from a user; and a communication unit for at least one of transmitting or receiving data between the remote controller and the UAV or a load carried by the UAV, wherein the communication unit is configured to transmit an instruction to operate at least one of the UAV or the load based on the user input, wherein the remote controller is configured to transform between (1) a single-hand operation mode that enables the user to control an operation of both the UAV and the load using the user input from a single hand while being held by the single hand, and (2) a multi-hand operation mode that enables the user to control the operation of both the UAV and the load using at least two hands while holding the remote controller using the at least two hands.

In some embodiments, the load comprises at least one of a payload carried by the UAV or a carrier of the payload configured to couple the payload to the UAV.

In some embodiments, the remote controller further comprises a controller module configured to generate a control signal comprising information relating to a functionality of the user input component, and wherein the controller module is configured to generate the control signal to transform the remote controller between the single-hand operation mode and the multi-hand operation mode. In some embodiments, the control signal generated by the controller module is configured to modify a functionality of the first user input component to change user input received at the first user input component between providing instruction to operate the UAV and providing instruction to operate the load. In some embodiments, the control signal generated by the controller module is configured to toggle between a first functionality and a second functionality of the user input component, the first functionality including providing instructions to operate the UAV and the second functionality including providing instructions to operate the load. In some embodiments, the control signal generated by the controller module is configured to activate the user input component to convert user input received at the user input to instruction for operating at least one of the UAV or the load. In some embodiments, the information relating to the functionality of the user input comprises an instruction to perform a function in response to receiving the user input.

In some embodiments, the remote controller further comprises a transformation input component configured to receive input to trigger transformation between the single-hand operation mode and the multi-hand operation mode. The transformation input component may comprise a toggle switch. In some embodiments, the toggle switch is configured to toggle between more than two operation modes. In some embodiments, the toggle switch is configured to select one of: a multi-hand operation mode, a right-hand operation mode and a left-hand operation mode.

In some embodiments, in the multi-hand operation mode, the remote controller is configured to receive an auxiliary controller to control the UAV and the load carried by the UAV. The auxiliary controller can be configured to be mountable to the remote controller. The auxiliary controller may comprise a visual display. In some embodiments, the auxiliary controller is a mobile device, including a cellphone or mobile electronic tablet. The auxiliary controller can communicate with the remote controller.

In some embodiments, the remote controller further comprises a main body and a first handle, the first handle being configured to be in a first configuration in the single-hand operation mode and a second configuration in the multi-hand operation mode. In some embodiments, the remote controller further comprises a second handle configured to be in a first configuration in the single-hand operation mode and a second configuration in the multi-hand operation mode. A position of each of the first handle and the second handle relative to the main body can be changeable in a transformation of the remote controller from the single-hand operation mode to the multi-hand operation mode. In some embodiments, the first handle is configured to extend away from the main body in the second configuration. The first handle is configured to be pivotally coupled to the main body. In some embodiments, the first foldable handle is configured to fold towards the main body in the first configuration.

In some embodiments, the first handle is configured to support at least a portion of an auxiliary controller in the second configuration. In some embodiments, the auxiliary controller comprises a visual display. In some embodiments, the auxiliary controller is a mobile device. In some embodiments, the first handle and the second handle each comprise a respective recess configured to receive a corresponding portion of the auxiliary controller. The respective recess may comprise an anti-slip material configured to maintain the auxiliary controller between the first foldable handle and the second foldable handle.

In some embodiments, the remote controller further comprises a position sensor configured to detect whether the remote controller is in the single-hand operation mode or the multi-hand operation mode. The remote controller can comprise a main body and a first handle, the first handle being configured to be in a first configuration in the single-hand operation mode and a second configuration in the multi-hand operation mode. In some embodiments, the position sensor is configured to detect a position of the first handle relative to main body. In some embodiments, the position sensor is configured to detect whether the remote controller is in the first configuration or the second configuration. In some embodiments, the position sensor comprises an angle sensor, wherein the first handle is rotated away from the main body in the second configuration, wherein the first handle is rotated towards the main body in the first configuration, and wherein the position sensor is configured to detect an angle of rotation of the first handle relative to the main body. In some embodiments, the position sensor comprises at least one of a contact sensor or a proximity sensor. In some embodiments, the contact sensor comprises a mechanical switch. In some embodiments, the proximity sensor comprises a magnetic position detector.

In one aspect, a method of operating an unmanned aerial vehicle (UAV) can comprise: transforming a remote controller to operate between (1) a single-hand operation mode that enables the user to achieve a controlled operation of both the UAV and the load using a user input while holding the remote controller using a single hand, and (2) a multi-hand operation mode that requires the user to use at least two hands to achieve the controlled operation of both the UAV and a load carried by the UAV; receiving a user input at the user input component; and transmitting an instruction to operate at least one of the UAV or the load based on the user input.

In some embodiments, the method can further comprise generating by a controller module of the remote controller, a control signal comprising information relating to a functionality of the user input component, and wherein the control signal is generated in response to transforming the remote controller between the single-hand operation mode and the multi-hand operation mode. In some embodiments, the control signal generated by the controller module is configured to modify the functionality of the user input component to change user input received at the user input component between providing an instruction to operate the UAV and providing an instruction to operate the load. In some embodiments, the method further comprises, in the multi-hand operation mode, coupling to the remote controller an auxiliary controller.

In some embodiments, the remote controller comprises a main body and a first handle and a second handle each pivotally coupled to the main body at a respective first end, and wherein transforming the remote controller to operate between the single-hand operation mode and the multi-hand operation mode comprises rotating the first handle and the second handle relative to the main body.

In one aspect, a remote controller for operating an unmanned aerial vehicle (UAV) can comprise: a user input component configured to receive a user input to effect operation of at least one of the UAV or a load carried by the UAV; a capacitive touch screen disposed on a surface of the remote controller configured to detect a pattern of contact on the capacitive touch screen; and a controller unit in the remote controller configured to generate a control signal to select a function of the user input component based at least in part on the detected pattern of contact.

In some embodiments, the remote controller is configured to change between a single-hand operation mode and a multi-hand operation mode. In some embodiments, the change between the single-hand operation mode and the multi-hand operation mode comprises the change in function of the user input component. In some embodiments, the remote controller is configured to activate conversion of the user input received at the user input component to instruction for controlling at least one of the UAV or a load carried by the UAV to change the function of the user input component. In some embodiments, the remote controller is configured to convert the user input received at the user input component from instructions to control the UAV to instructions to control a load carried by the UAV.

In some embodiments, the surface of the remote controller on which the capacitive touch screen is disposed faces away from a user providing the user input when the remote controller is operated by the user.

In some embodiments, the controller unit is configured to generate a control signal to change a physical configuration state of the remote controller to a transformed state based on the detected pattern of contact. In some embodiments, the remote controller further comprises a main body, a first foldable handle and a second foldable handle, and wherein the control signal generated by the remote controller to change the physical configuration state of the remote controller comprises instruction to change the orientation of the first handle and the second handle relative to the main body. In some embodiments, the change in the orientation of the first foldable handle and the second foldable handle relative to the main body comprises rotation of the first foldable handle and the second foldable handle away from the main body. In some embodiments, the change in physical configuration state of the remote controller is configured to accommodate an auxiliary controller between the first and second foldable handles in the transformed state.

In some embodiments, the controller unit is configured to select a physical configuration state of the remote controller from a single-hand operation mode or a multi-hand operation mode based on a shape of the detected pattern of contact.

In some embodiments, the controller unit is configured to select the single-hand operation mode if a similarity between the shape of the detected pattern of contact and a first predetermined shape is equal to or greater than a threshold. In some embodiments, the controller unit is configured to select the single-hand operation mode if a similarity between the shape of the detected pattern of contact and a second predetermined shape is equal to or greater than a threshold. In some embodiments, the controller unit is further configured to generate a control signal comprising information relating to a functionality of the user input component based on the selected physical configuration state.

In some embodiments, the controller unit is configured to select a physical configuration state of the remote controller from a single-hand operation mode or a multi-hand operation mode based on at least one of an area of the contact on the capacitive touch screen or a force of the contact. In some embodiments, the controller unit is configured to select the single-hand operation mode if the area of the contact is smaller than a threshold contact area. In some embodiments, the controller unit is configured to select the multi-hand operation mode if the area of the contact is equal to or greater than a threshold contact area. In some embodiments, the controller unit is configured to select the single-hand operation mode if the force of the contact is larger than a threshold force. The controller unit can be further configured to generate a control signal comprising information relating to a functionality of the user input component based on the selected physical configuration state.

In one aspect, a method of operating an unmanned aerial vehicle (UAV) can comprise: detecting contact on a capacitive touch screen disposed on a surface of a remote controller; generating a control signal to select a function of a user input component of the remote controller based on the detected contact; and receiving a user input at the user input component and effecting operation of at least one of the UAV or a load carried on the UAV in accordance with the selected function of the user input component.

In some embodiments, the method further comprises transforming the remote controller to operate between (1) a single-hand operation mode that enables the user to achieve a controlled operation of both the UAV and the load using a user input while holding the remote controller using a single hand, and (2) a multi-hand operation mode that requires the user to use at least two hands to achieve the controlled operation of both the UAV and a load carried by the UAV, and wherein generating the control signal to select the function of the user input component is performed in response to transforming the remote controller to operate between the single-hand operation mode and the multi-hand operation mode.

In some embodiments, the remote controller comprises a main body and a first handle and a second handle each pivotally coupled to the main body at a respective first end, and wherein transforming the remote controller to operate between the single-hand operation mode and the multi-hand operation mode comprises a physically transforming the remote controller to rotate the first handle and the second handle relative to the main body.

In some embodiments, generating the control signal to select the function of the user input component comprises converting the user input received at the user input component from instructions to control the UAV to instructions to control a load carried by the UAV.

In some embodiments, detecting the contact comprises detecting at least one of a shape, an area, or a force of contact on the capacitive touchscreen.

In one aspect, a remote controller for controlling an unmanned aerial vehicle (UAV) can comprise: a first user input component at a first position on the remote controller; a second user input component at a second position on the remote controller; and wherein the first user input component is in an active state to receive a user input from a user to provide instruction to operate at least one of the UAV or a load carried by the UAV, and wherein the second user input component is in an inactive state, the second user input component being disabled from providing instruction to operate at least one of the UAV or the load based on any user input received by the second input component in the inactive state.

In some embodiments, the remote controller is configured to determine whether the remote controller is in a first configuration or a second configuration, and to set the second user input component to the inactive state if the remote controller is in the first configuration. The first configuration can be a single-hand operation mode.

In some embodiments, the remote controller further comprises a motion sensor configured to provide information to control one of the UAV or the load carried by the UAV. In some embodiments, the motion sensor comprises an inertial measurement unit (IMU). In some embodiments, the motion sensor comprises at least one of an inertial sensor or a magnetometer. The motion sensor can be configured to provide information to control orientation of the load. The first user input element can be configured to receive the user input to control flight of the UAV.

In some embodiments, the UAV performs autonomous flight and wherein the first user input element is configured to receive user input to control a parameter setting of the load. The load can be a camera and the parameter setting can comprise a shutter setting of the camera. In some embodiments, the motion sensor is configured to provide information to control flight of the UAV. In some embodiments, the first user input component is configured to control the orientation of the load.

In some embodiments, the orientation of the load is controlled using a Global Positioning System (GPS). In some embodiments, the first user input component is configured to receive user input for controlling the UAV. In some embodiments, each of the first user input component is a first joystick and the second user input component is a second joystick. In some embodiments, movement of the first joystick along a first direction is configured to set a distance of the UAV away from the remote controller. In some embodiments, movement of the first joystick along a second direction perpendicular to the first direction is configured to set a phase angle of the UAV relative to the remote controller. The phase angle can be at least one of a pitch, yaw, or roll angle of the UAV.

In some embodiments, the orientation of the load is controlled using intelligent vision. In some embodiments, the orientation of the load is configured to follow the user. The first user input component can be configured to receive user input for controlling flight of the UAV.

In some embodiments, each of the first user input component is a first joystick and the second user input component is a second joystick. In some embodiments, movement of the first joystick along a first direction is configured to set a distance of the UAV away from the remote controller. In some embodiments, movement of the first joystick along a second direction perpendicular to the first direction is configured to set a phase angle of the UAV relative to the remote controller. In some embodiments, the phase angle is at least one of a pitch, yaw, or roll angle of the UAV.

In some embodiments, the first user input element and the second user input element each comprise a joystick. In some embodiments, the first input component is configured to receive input from a thumb of the user. In some embodiments, the first input component and the second input component are at a symmetrical position on a first surface of the remote controller.

In some embodiments, the remote controller is configured to be held in one hand of the user for single-hand operation. In some embodiments, the remote controller is configured to be held in one of a right hand or a left hand of the user.

In some embodiments, the first user input element comprises a voice recognition component. In some embodiments, the first user input element comprises a touch screen. In some embodiments, the first user input element comprises a joystick. In some embodiments, the first user input element comprises an image capture device.

In one aspect, a method of controlling an unmanned aerial vehicle (UAV) can comprise: receiving at a first user input component at a first position on the remote controller; converting the user input received at the first user input component to instruction for operating at least one of the UAV or a load carried by the UAV; and disregarding any user input received at a second user input component at a second position on the remote controller, the second user input component being disabled from providing instruction to operate the UAV or the load.

In some embodiments, the method further comprises determining whether the remote controller is in (1) a single-hand operation mode that enables the user to control an operation of both the UAV and the load using the user input from a single hand while being held by the single hand, or (2) a multi-hand operation mode that enables the user to control the operation of both the UAV and the load using at least two hands while holding the remote controller using the at least two hands, In some embodiments, disregarding any user input received at the second user input component if the remote controller is in the single-hand operation mode.

In some embodiments, the first user input element and the second user input element each comprise a joystick. In some embodiments, the first input component is configured to receive input from a thumb of the user.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
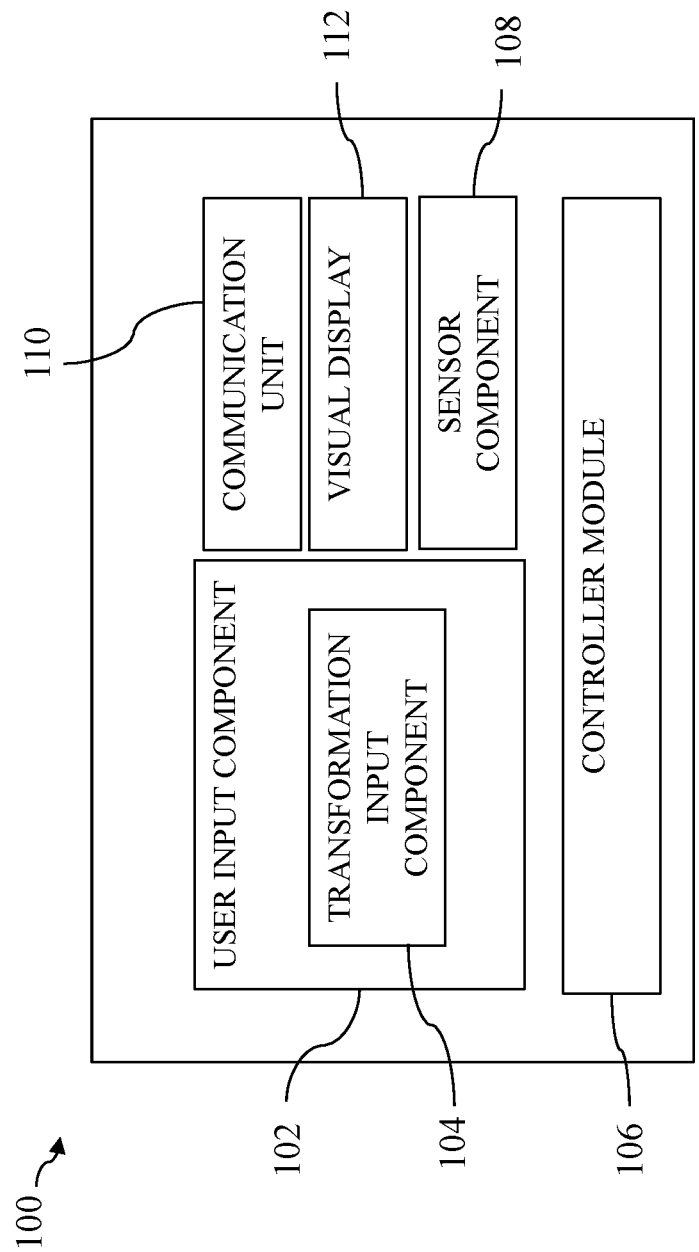
FIG. 1 is a schematic diagram of an example of a transformable remote controller in a single-hand operation mode.

While some embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Methods and apparatuses described herein relate to a transformable remote controller configured to be transformable between a single-hand operation mode and a multi-hand operation mode. The transformable remote controller can engage in a physical transformation to transform between the single-hand operation mode and the multi-hand operation mode. In some embodiments, a functionality of one or more input components of the transformable remote controller can change in the transformation between the single-hand operation mode and the multi-hand operation mode. The transformable remote controller can be configured to transmit instruction signals to a movable object, including an aerial vehicle, such as an unmanned aerial vehicle (UAV), for controlling operations of the aerial vehicle. For example, the transformable remote controller can be configured to control one or more parameters of the flight of the UAV, including for determining a flight path of the UAV. In some embodiments, the transformable remote controller can be configured to control one or more loads carried by the UAV, including one or more of a payload carried by the UAV, and a payload carrier. The payload carrier can comprise a coupling component configured to couple the payload to the UAV, such as a payload mount (e.g., a gimbal). For example, the transformable remote controller can be configured to transmit one or more instruction signals for controlling operation of the payload and/or operation of a gimbal which couples the payload to the UAV.

In the single-hand operation mode, the transformable remote controller can be configured to be held by a user using a single hand while enabling the user to use the transformable remote controller to provide desired control of the UAV and/or one or more loads carried by the UAV, leaving the user's other hand free for other activities. In some embodiments, the transformable remote controller in the single-hand operation mode can be configured to enable a user to control both the UAV and a payload. For example, the user may use the transformable remote controller in the single-hand operation mode while the user desires to be mobile. The user may be engaged in a sports activity while carrying the transformable remote controller in the single-hand operation mode using one hand such that the other hand of the user can be available for balancing. The user may be walking, running, rollerblading, skateboarding, or snowboarding. The user may be on a vehicle, including a motorized vehicle, while operating the transformable remote controller in the single-hand operation mode such that other hand of the user can be used to operate the vehicle. For example, the user may be on a bicycle, a scooter, and/or a motorcycle. The single-hand operation mode may comprise a compact configuration, for example sized and/or shaped to facilitate holding of the transformable remote controller in one hand of the user.

In some embodiments, the transformable remote controller in the single-hand operation mode can be configured to receive user input for either the UAV or the one or more loads carried by the UAV. For example, the transformable remote controller may be configured to receive input either for controlling flight of the UAV or operation of a payload carried by the UAV. The transformable remote controller receives input for controlling the payload while the UAV engages in autonomous or semi-autonomous flight. Alternatively, the transformable remote controller can receive input for controlling the UAV while the payload is set to an automated or semi-automated setting. In some embodiments, the transformable remote controller in the single-hand operation mode can be configured to receive user input for controlling both the UAV and the one or more loads carried by the UAV.

The transformation between the single-hand operation mode and the multi-hand operation mode may comprise a physical transformation of the transformable remote controller. In the multi-hand operation mode, the transformable remote controller can be configured to be held by two hands of the user. The multi-hand operation mode may comprise an expanded configuration. The transformable remote controller in the expanded configuration can be configured to receive the auxiliary controller module. The auxiliary controller module may be physically coupled to the transformable remote controller module. For example, the transformable remote controller may comprise a main body, and a first handle and a second handle coupled to the main body. The first handle and the second handle can be rotatable relative to the main body such that the first handle and the second handle extend away from the main body in the multi-hand configuration. The first handle and the second handle can extend away from the main body such that the auxiliary controller module can be received and maintained between the first handle and the second handle. In some embodiments, the first handle and the second handle can comprise respective engagement features to couple to the auxiliary controller module.

The auxiliary controller may be in electronic communication with the transformable remote controller via a wired and/or a wireless connection, such that the auxiliary controller module can be configured to receive user input and/or display one or more status information of the UAV and/or the one or more loads. The auxiliary controller module and the transformable remote controller can be used together to control the UAV and/or the one more loads. In some embodiments, the auxiliary controller module comprises a mobile electronic device, such as a cellphone or a tablet.

In the multi-hand operation mode, the transformable remote controller can be configured to enable the user to provide desired control of the UAV and/or one or more loads carried by the UAV using both hands of the user. The transformable remote controller in the multi-hand operation mode can be configured to enable desired control of both the UAV and a payload carried by the UAV using both hands. A user may be able to control more parameters for the operation of a UAV and/or the operation of a load carried by the UAV in the multi-hand operation mode than in the single-hand operation mode. The transformable remote controller can be configured to receive more types of user input in the multi-hand operation mode than in the single-hand operation mode. For example, one or more input components active in the multi-hand operation mode may be inactive in the single-hand operation mode, such that input received at the inactive input component is disregarded and/or does not result in the generation of an instruction signal. In some embodiments, a functionality of an input component of the transformable remote controller can be different in the multi-hand operation mode from that in the single-hand operation mode. User interaction received at the input component while the remote controller is in the single-hand operation mode can result in generating an instruction signal different from that generated as a result of user interaction with the same input component while the remote controller is in the multi-hand operation mode. In some embodiments, transforming between the single-hand operation mode and the multi-hand operation mode can trigger a change in the functionality of an input component.

In some embodiments, a transformation between the single-hand operation mode and the multi-hand operation can be triggered by a user input. In some embodiments, a transformation between the single-hand operation mode and the multi-hand operation can be in response to a detected state sensed by a sensor.

In some embodiments, a system can comprise a UAV and one or more transformable remote controllers described herein. In some embodiments, a system can comprise a UAV, one or more loads carried by the UAV, and one or more transformable remote controllers described herein.

FIG. 1 is a schematic diagram of an example of a transformable remote controller 100 in a single-hand operation mode. The transformable remote controller can be configured to be transformable between the single-hand operation mode and a multi-hand operation mode. The transformable remote controller can be configured to provide control of the operation of a UAV, and/or one or more loads carried by the UAV, while being held by the user in one hand for the single-hand operation mode or while being held by the user using two hands for the multi-hand operation mode. For example, the transformable remote controller, in each of the single-hand operation mode and the multi-hand operation mode can be configured to enable a user to provide desired control of the operation of both the UAV and the one or more loads carried by the UAV. The multi-hand operation mode is described herein in further details with reference to FIG. 2.

In the single-hand operation mode, a user can carry the transformable remote controller using one hand and provide desired operation of the UAV and/or the one or more loads carried by the UAV using the one hand. For example, in the single-hand operation mode, a user can hold the transformable remote controller in one hand and provide input to the transformable remote controller, with the one hand, to provide desired control of both the UAV and the one or more loads, while leaving the other hand free for other activities. A user can use the transformable remote controller while the user desires to be mobile, such as when a user is engaged in a sports activity and/or on a vehicle. For example, the user can use the other hand for balance and/or to operate the vehicle.

The transformable remote controller 100 can include a user input component 102, a controller module 106, a sensor component 108, and a communication unit 110. The user input component 102 can be configured to receive input from the user. The user input component may comprise a transformation input component 104 configured to receive input from the user for instructing the transformable remote controller to transform between the single-hand operation mode and the multi-hand operation mode. The sensor component 108 may comprise one or more sensors configured to detect a state of an environment of the UAV, transformable remote controller and/or a load carried by the UAV, a state of the UAV, a state of the transformable remote controller, and/or a state of interaction between the user and the transformable remote controller. The controller module 106 (e.g., a control circuit) can be configured to receive signals generated by the user input component and/or transformation input component in response to user input, and/or information detected by the sensor component 108, and generate instruction signals to control the UAV and/or one or more loads carried by the UAV. The communication unit 110 (e.g., a communication circuit) can be configured to be in communication with an external device, such as the UAV and/or one or more loads carried by the UAV, such as to transmit to the UAV and/or the one or more loads the instruction signals generated by the controller module. As will be described in further details herein, the communication unit can provide communication between the transformable remote controller and an auxiliary controller.

Although the user input component 102, transformation input component 104, controller module 106, sensor component 108 and communication unit 110 are shown as distinct blocks in FIG. 1, it will be understood that one or more of the user input component 102, transformation input component 104, controller module 106, sensor component 108 and communication unit 110 can comprise one or more overlapping components.

The transformable remote controller 100 can include a user input component 102 configured to receive input from the user. The user input component can comprise one or more distinct input components with which the user can interact to provide instructions to the transformable remote controller. In some embodiments, the user input component can comprise one or more of a joystick, a toggle switch, and a push button. For example, an input component may be a joystick, a toggle switch, or a push button. The user can direct a joystick, flip a toggle switch or press a push button to provide input to the transformable remote controller. In some embodiments, the user input component comprises a sensor. The sensor may be configured to sense a direct or indirect interaction between the user and the transformable remote controller. For example, the sensor may be configured to detect one or more of an audio, image, and/or tactile input from the user. In some embodiments, the sensor may be a part of the sensor component 108, and may comprise one or more characteristics of the sensor component 108 as described herein. An input component can be configured to enable a user to power on or power off the transformable remote controller, the UAV, and/or one or more loads carried by the UAV. An input component can be configured to enable a user to provide input for one or more parameters useful for controlling the operation of the UAV and/or one or more loads carried by the UAV. For example, input components can be configured to receive instructions for parameters to control flight of the UAV. In some embodiments, input components can be configured to receive instructions for parameters to control operation of a payload. For example, the payload can comprise an imaging device, such as a camera. The transformable remote controller can comprise one or more input components for receiving selections relating to starting or stopping image capture, duration of image capture, and/or one or more image settings of the camera, including one or more manual settings of the camera such as aperture, shutter speed, and/or zoom. The input components can be configured to provide control of an orientation of the payload, for example an orientation of a camera.

In some embodiments, in the single-hand operation mode, the transformable remote controller 100 can be configured to receive instructions from the user to provide dynamic control of either the UAV or one or more loads carried by the UAV. For example, in the single-hand operation mode, the UAV or one or more loads carried by the UAV can operate autonomously or semi-autonomously. In some embodiments, the transformable remote controller can be configured to enable continued control of either the UAV or one or more loads carried by the UAV, while the other of the UAV or the one or more loads operates autonomously. As described herein, the one or more loads can comprise a payload and/or a coupling structure for coupling the payload to the UAV (e.g., gimbal). For example, the user input component 102 can be configured to receive on-going input for dynamically controlling one of the UAV or a payload and/or gimbal carried by the UAV, while the other of the UAV and payload and/or gimbal can operate autonomously after the UAV and payload and/or gimbal is initiated or powered on. The other of the UAV and payload and/or gimbal can operate autonomously without further input form the user, such as other than an input for instructing an initiation or powering on step. For example, in the single-hand operation mode, the UAV may engage in autonomous flight while the user can use the transformable remote controller to provide on-going control of the payload. In some embodiments, the transformable remote controller can enable continued control of the UAV while the payload operates autonomously.

In some embodiments, in the single-hand operation mode, the transformable remote controller 100 can be configured to enable continued control of either the UAV or one or more loads carried by the UAV, while the other of the UAV or the one or more loads operates semi-autonomously. In some embodiments, the UAV or the one or more loads can operate autonomously, such as after initiation and/or powering on without further user intervention, while the transformable remote controller can be configured to receive continued input for dynamically controlling the other of the UAV or the one or more loads. In some embodiments, in the single-hand operation mode, the UAV may engage in semi-autonomous flight while the user can use the transformable remote controller to provide on-going control of the payload and/or gimbal. The transformable remote controller in the single-hand operation mode can be configured to receive one or more initial settings for the UAV and/or a payload carried by the UAV, while enabling the user to provide continued dynamic control of one of the UAV or the payload. For example, the user input component 102 can be configured to receive one or more initial setting selections for the UAV or the payload and/or gimbal, and one of the UAV or the payload and/or gimbal can subsequently operate without further user intervention based on the one or more initial settings, while the user input component can be configured to receive continued input for dynamically controlling the other of the UAV or the payload and/or gimbal. In some embodiments, the transformable remote controller can enable continued control of the UAV while the payload and/or gimbal operate semi-autonomously.

In some embodiments, semi-autonomous operation of the UAV in the single-hand operation mode can comprise instructing the UAV to perform a particular task and/or fly to a target destination. The user may input one or more of a target destination, a designated task, and/or one or more parameters for the UAV flight. For example, the user can provide input to the transformable remote controller to fly to a target destination for performing a task. The input may comprise the pattern of flight performed by the UAV during flight, during completion of the task, and/or upon arrival at the target destination. For example, the user may instruct the UAV to fly to a target destination, and that once the UAV arrives at the target destination, the UAV is to hover in place, fly in a circle at a particular distance from the target destination, or perform any other pattern of flight. The user may use the transformable remote controller to dynamically control the one or more loads (e.g., a payload and/or a carrier of the payload which couples the payload to the UAV) once the UAV arrives at the target destination and/or engages in the designated pattern of flight once at the target destination. In some embodiments, the user may use the remote control both the UAV and the one or more loads once the UAV is at the target destination. In some embodiments, the user may initially instruct the UAV to follow a target subject using the transformable remote controller. For example, the one or more loads carried by the UAV may comprise an imaging device such that the user can indicate a target subject to the remote controller based on objects within a field of view of the imaging device. The user may instruct the UAV to engage in a pattern of flight relative to the target subject, such as to fly alongside or encircle the target subject to maintain the target subject within its field of view. In some embodiments, the user may use the transformable remote controller to provide continued control of the operations of one or more loads of the UAV (e.g., a payload and/or a carrier of the payload which couples the payload to the UAV) after the target subject has been selected and the UAV engages in the designated pattern of flight. In some embodiments, the UAV and/or the one or more loads can be configured to operate autonomously or semi-autonomously based at least in part on information detected by one or more sensors, including one or more sensors of the transformable remote controller. For example, operation of the UAV and/or the one or more loads can be based on information collected by one or more sensors of the transformable remote controller.

In some embodiments, the UAV and/or the one or more loads can operate autonomously based on the information from the one or more sensors without other inputs (e.g., other than powering on the UAV and/or the transformable remote controller). In some embodiments, the UAV and/or the one or more loads can operate semi-autonomously based on the information from the one or more sensors such that the transformable remote controller can be used to control another aspect of the operation of the UAV or the one or more loads. The one or more sensors can comprise one or more of a motion sensor, an inertial measurement unit (IMU) and a Global Positioning System (GPS).

In some embodiments, the transformable remote controller 100 in the single-hand operation mode can be configured to provide on-going control of both the UAV and one or more loads carried by the UAV. For example, the transformable remote controller in the single-hand operation mode can be configured to provide on-going control of both the UAV and the payload and/or gimbal.

In some embodiments, the transformable remote controller 100 can be configured to receive fewer types of user input in the single-hand operation mode than in the multi-hand operation mode. In some embodiments, the user input component 102 can comprise one or more input components which are inactive in the single-hand operation mode. For example, these input components can be active when the transformable remote controller is in the multi-hand operation mode. User interaction received at the one or more inactive input components can be disregarded while the transformable remote controller is in the single-hand operation mode. For example, user interaction received at an inactive input component may not be converted to an instruction signal for controlling the UAV and/or a load carried by the UAV. The controller module 106 of the transformable remote controller may determine that an input signal is from an input component which is inactive and disregard that input signal such that the input signal generated by the interaction of the user with the inactive input component is ignored. In some embodiments, the one or more inactive input components can be disabled in the single-hand operation mode. For example, interaction with the disabled input component may not generate any input signals.

In some embodiments, the user input component 102 can comprise one or more input components which are configured to generate a signal which is converted to an instruction signal while the transformable remote controller is in the single-hand operation mode different from an instruction signal to which the signal would be converted while the transformable remote controller is in the multi-hand operation mode. For example, the controller module may be configured to generate an instruction signal to control a first parameter from an input received at an input component while the transformable remote controller is in the single-hand operation mode, and to generate an instruction signal to control a second parameter from an input received at the same input component while the transformable remote controller is in the multi-hand operation mode, where the first parameter is a different parameter than the second parameter. In some embodiments, a user command received at an input component can be configured for generating an instruction signal for controlling the UAV or a load carried by the UAV while the transformable remote controller is in the single-hand operation mode, and a user command received at the user input while the transformable remote controller is in the multi-hand operation mode can be converted to an instruction signal for controlling the other of the UAV or the load. In some embodiments, a user command received at an input component while the transformable remote controller is in the single-hand operation mode can be configured for generating an instruction signal for controlling a different parameter for operating the UAV or a load carried by the UAV than while the transformable remote controller is in the multi-hand operation mode.

In some embodiments, the user input component 102 comprises a transformation input component 104 configured to receive input from the user for transforming the transformable remote controller 100 between the single-hand operation mode and the multi-hand operation mode. Input received at the transformation input component can trigger transformation of the transformable remote controller. The transformation input component can comprise any one of a variety of input components which can receive input instructions from a user. In some embodiments, the transformation input component can comprise one or more of a joystick, a toggle switch, and a push button. For example, a user may manipulate a joystick, flip a toggle switch and/or press a push button to instruct the transformable remote controller to transform between the single-hand operation mode and the multi-hand operation mode. In some embodiments, the transformation input component can comprise one or more sensor components configured to detect a state of the transformable remote controller. The one or more sensor components can be a part of the sensor component 108.

Transformation of the transformable remote controller 100 between the single-hand operation mode and the multi-hand operation mode can comprise a physical transformation of the transformable remote controller and/or a change in functionality of one or more input components of the transformable remote controller. For example, input received at the transformation input component 104 can trigger the physical transformation and the changes in functionality of one or more input components. The physical transformation and the changes in functionality of one or more input components can be completed automatically by the transformable remote controller. For example, after user input is received at the transformation input component, the controller module 106 can generate one or more instruction signals for activating one or more actuators to perform the physical transformation and for changing the functionality of one or more input components. In some embodiments, at least a portion of the physical transformation of the transformable remote controller can be performed manually by a user. For example, the user can manually manipulate the transformable remote controller to effect the physical transformation. In some embodiments, the user may manually effect some change in the physical configuration of the transformable remote controller and the remaining physical change can be completed by the transformable remote controller. For example, one or more sensors of the transformable remote controller can detect that some physical transformation has occurred, and in response, complete the transformation to the single-hand or multi-hand operation mode, such as including the remaining physical transformation and/or any changes in functionality of one or more input components. The controller module of the transformable remote controller, in response to receiving information from the sensors, may generate one or more instruction signals for activating one or more actuators to achieve the remaining physical transformation and and/or any changes in functionality of one or more input components. In some embodiments, the user can manually effect the complete physical transformation between the single-hand or multi-hand operation mode, and in response to detecting the physical transformation, the transformable remote controller can initiate any changes in functionality of one or more input components (e.g., the controller module can generate one or more instruction signals for changing the functionality of one or more input components). In some embodiments, input received at the transformation input component can trigger a portion of the physical transformation and the user can complete the physical transformation. In response to detecting the physical transformation, the transformable remote controller can initiate any changes in functionality of one or more input components.

The sensor component 108 can be configured to sense one or more conditions indicative of one or more of a state of the transformable remote controller, a state of an environment of the transformable remote controller and a state of interaction between a user and the transformable remote controller. In some embodiments, information collected by the sensor component of the transformable remote controller can be used to control the UAV and/or the one or more loads. For example, information collected by the one or more sensor components can be used to control orientation of a payload carried by the UAV, while user input received at the user input component 102 can control operation of the UAV, such as a flight path of the UAV. Alternatively, the information gathered by the one or more sensor components can be used to control orientation of the UAV, and user input received at the user input component 102. In some embodiments, information collected by the sensor component can be configured to determine whether the transformable remote controller 100 is in the single-hand operation mode or the multi-hand operation mode. The transformable remote controller can initiate a transformation to the single-hand or multi-hand operation mode in response to the detected state of the remote controller.

In some embodiments, the sensor component 108 can comprise one or more of a sound sensor, a motion sensor, a tactile sensor, and an image sensor. In some embodiments, the sensor component can comprise one or more of a contact sensor, an angle sensor and a proximity sensor. In some embodiments, the sensor component can comprise a Global Positioning System unit (GPS).

A sound sensor can be configured to detect audio instructions provided to the transformable remote controller, such as a voice recognition component. The sound sensor can be configured to receive audio instructions from a user to control one or more operations of the UAV and/or the one or more loads.

A motion sensor can be configured to provide information to control orientation of one or more loads, including a payload and/or a payload carrier, and/or the orientation of the UAV. For example, one or more motion sensors can be configured to detect motion of a target subject such that the one or more loads and/or UAV can be configured to be oriented towards the target subject. In some embodiments, the motion sensor comprises an inertial measurement unit (IMU). In some embodiments, the motion sensor comprises at least one of an inertial sensor or a magnetometer. In some embodiments, the GPS can be configured to provide information to control a load carried by the UAV, such as an orientation of the load, for example such that the load can be oriented towards the location as indicated by the GPS (e.g., the location of the remote controller).

In some embodiments, a proximity sensor, angle sensor and/or contact sensor can be configured to detect whether the transformable remote controller 100 is in the single-hand or multi-hand operation mode. For example, one or more of the proximity sensor, angle sensor and/or contact sensor can be configured to detect a relative position of a component of the remote controller (e.g., a first handle and a second handle of the remote controller) for determining whether the remote controller is in the single-hand or multi-hand operation mode.

A tactile sensor may be one or more of a piezoresistive, piezoelectric, capacitive and elastoresistive sensors. For example, the tactile sensor may comprise a capacitive touch screen. In some embodiments, a tactile sensor can be configured to detect extent of contact between the user and the transformable remote controller. For example, a tactile sensor can be configured to sense one or more of an area of contact, shape of contact, and force of contact between the user, such as the user's hand, and the transformable remote controller. In some embodiments, a tactile sensor can comprise one or more touchscreens for receiving input from the user.

In some embodiments, the sensor component 108 can comprise an image sensor configured to capture an image. The transformable remote controller 100 can be configured to capture the image and the controller module can be configured to generate one or more instruction signals based on the captured image. For example, the image sensor can comprise an imaging device, such as a camera.

In some embodiments, the transformable remote controller 100 in the single-hand operation mode comprises a visual display 112. The visual display may be configured to display one or more parameters of the UAV and/or the one or more loads to the user. For example, the visual display may present to the user status information of the UAV and/or the one or more loads. The visual display can show to the user information based on which the user can control the UAV and/or the one or more loads. In some embodiments, a load can comprise an imaging device, such as a camera, and the visual display can enable the user to view images captured by the imaging device and/or display to the user the field of view of the imaging device (e.g., including in real-time).

In some embodiments, the transformable remote controller 100 does not comprise a visual display. As will be described in further details herein, in some embodiments, an auxiliary controller module coupled to the transformable controller module can comprise a visual display. In some embodiments, the transformable remote controller does not comprise a visual display while the auxiliary remote controller comprises a visual display. In some embodiments, both the transformable remote controller and the auxiliary controller module comprise visual displays.

Figure 2:
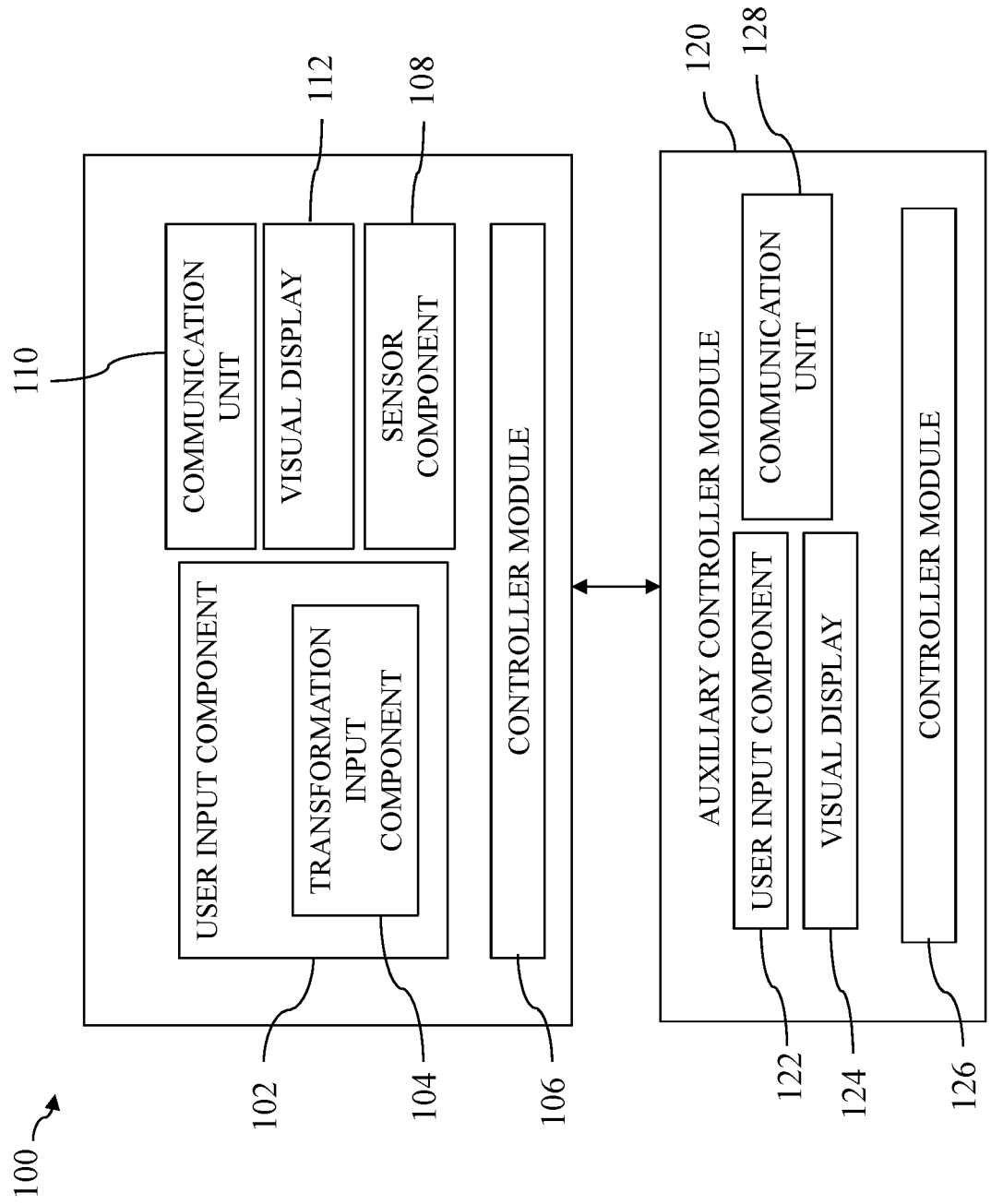
FIG. 2 is a schematic diagram of an example of the transformable remote controller of FIG. 1 in a multi-hand operation mode.

FIG. 2 is a schematic diagram of the transformable remote controller 100 in the multi-hand operation mode. As described herein, the transformable remote controller can be configured to transform between the single-hand operation mode and a multi-hand operation mode. The transformation between the single-hand operation mode and the multi-hand operation mode can comprise a physical transformation, the single-hand operation mode comprising a physical configuration different from that of the multi-hand operation mode. For example, the single-hand operation mode may comprise a physically more compact configuration than the multi-hand configuration. A position and/or orientation of one or more portions of the transformable remote controller relative to another portion of the transformable remote controller may change during the transformation such that a shape of the transformable remote controller after the transformation is different from that prior to the transformation. In some embodiments, the one or more portions of the transformable remote controller can engage in one or more of the following movements relative to the other portion of the transformable remote controller: rotate, translate horizontally within the same horizontal plane (e.g., along a path comprising a linear and/or a curved portion), and translate vertically across multiple horizontal planes (e.g., along a path comprising a linear and/or curved portion).

In some embodiments, the transformation between the single-hand operation mode and the multi-hand operation mode can comprise a modification in functionality of one or more input components of the user input component 102 of the transformable remote controller 100. For example, functionality of one or more input components can be different in the single-hand operation mode from that in the multi-hand operation mode such that user interaction received at the one or more input components results in a different function being performed by the transformable remote controller. The functionality of the one or more input components can be determined based on whether the transformable remote controller is in the single-hand operation mode or the multi-hand operation mode. One or more input components can be inactive in the single-hand operation mode while being active in the multi-hand operation mode. In some embodiments, transformation between from the single-hand operation mode to the multi-hand operation mode provides access to one or more additional input components, such as one or more input components of an auxiliary controller module 300 coupled to the transformable remote controller in the multi-hand operation mode. In some embodiments, transformation between the single-hand operation mode and the multi-hand operation mode comprises both a physical transformation and a change in functionality of one or more input components. In some embodiments, transformation between the single-hand operation mode and the multi-hand operation mode comprises a physical transformation but no change in functionality of any input components. In some embodiments, transformation between the single-hand operation mode and the multi-hand operation mode comprises no physical transformation but a change in functionality of one or more input components.

Transformation of the transformable remote controller 100 can occur prior to, during, and/or after the UAV takes off for flight. In some embodiments, the transformable remote controller can be configured to complete the transformation prior to the UAV initiating flight. In some embodiments, the transformation can be completed during take-off. In some embodiments, the transformable remote controller can be configured to perform at least a part of the transformation during and/or after take-off. In some embodiments, the transformable remote controller can be configured to enable transformation without interrupting operation of the UAV and/or one or more loads carried by the UAV. For example, the transformable remote controller may be configured to perform at least a portion of the transformation during flight, including initiating and/or completing the transformation while the UAV is in flight, without interrupting operation of the UAV and/or one or more loads carried by the UAV.

The transformable remote controller 100 can be configured to be operated using two hands of the user in the multi-hand operation mode. In the multi-hand operation mode, the transformable remote controller can be configured to be in communication with an auxiliary controller module 120 such that a user can control the UAV and one or more loads carried by the UAV using both the transformable remote controller and the auxiliary controller module. The auxiliary controller module can comprise a mobile electronic device, including for example a cell phone or a tablet. For example, in the multi-hand operation mode, the transformable remote controller can be configured to be coupled to the auxiliary controller module. The transformable remote controller can be configured to receive the auxiliary controller module. The auxiliary controller can be mounted onto and/or positioned between corresponding receiving portions of the transformable remote controller such that the transformable remote controller and the auxiliary controller module can form a unitary component.

The auxiliary controller module 120 can comprise a user input component 122, a visual display 124, a controller module 126 and a communication unit 128. The user input component 122 can be configured to receive user input for controlling the UAV and/or one or more loads carried by the UAV. In some embodiments, the user input component of the auxiliary module can be part of a graphical user interface. The visual display may be configured to display one or more parameters of the UAV and/or the one or more loads to the user. For example, the visual display may display to the user status information of the UAV and/or the one or more loads. The controller module 126 can be configured to generate one or more instruction signals to facilitate control of the UAV and/or the one or more loads. The communication unit can be configured to provide communication between the auxiliary controller module, UAV and/or transformable remote controller.

In the multi-hand operation mode, the auxiliary controller module 120 and the transformable remote controller 100 can be used together to provide control of the UAV and/or the one or more loads carried by the UAV. In some embodiments, the auxiliary controller module 120 and the transformable remote controller 100 can be used together to provide control of both the UAV and a payload and/or payload mount, such as a camera and a gimbal configured to couple the camera to the UAV. In some embodiments, the auxiliary controller module 120 may be configured to display to the user a field of view of the camera and/or images captured by the camera to facilitate control of the UAV and the camera and/or gimbal such that desired images can be captured.

FIGS. 3-7 are schematic diagrams of an example of a transformable remote controller 200 in a single-hand operation mode. FIGS. 8-11 are schematic diagrams of an example of the remote controller 200 in a multi-hand operation mode. The transformable remote controller 200 is an example of the remote controller 100 described with reference to FIG. 1. The remote controller 200 can have one or more features of the remote controller 100 of FIG. 1.

Figure 3:
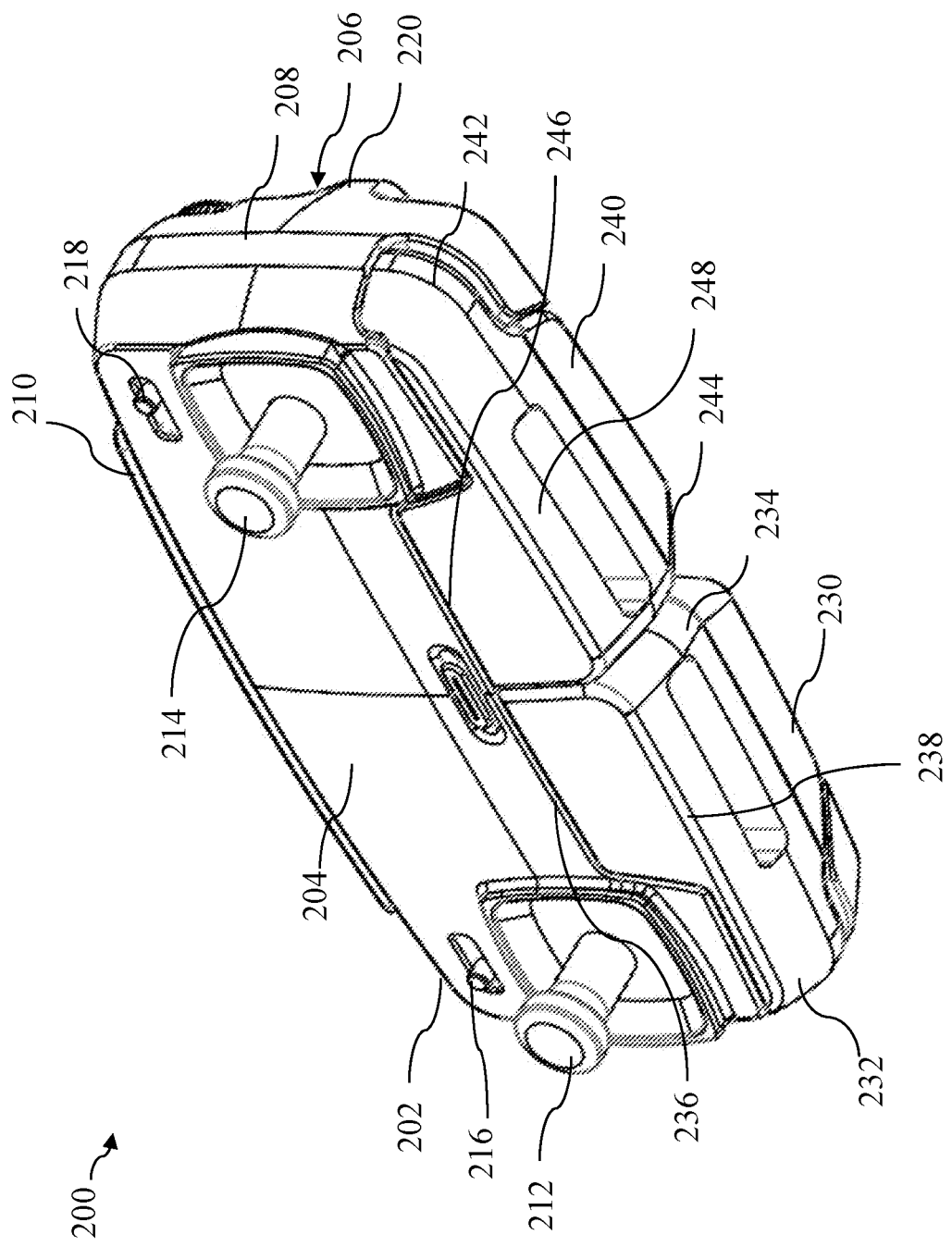
FIG. 3 is a perspective view of an example of a transformable remote controller in a single-hand configuration.

Referring to FIG. 3, a perspective view of an example of a transformable remote controller 200 in a single-hand operation mode. The transformable remote controller can be configured to transform between the single-hand operation mode and a multi-hand operation mode. The transformation between the single-hand operation mode and the multi-hand operation mode can comprise a physical transformation. For example, the single-hand operation mode may comprise a physically more compact configuration than the multi-hand configuration. The transformable remote controller can be configured to control operations of a UAV and/or one or more loads carried by the UAV. The one or more loads can comprise a payload and/or a carrier for coupling the payload to the UAV. In the single-hand operation mode, a user can hold the remote controller using a single hand while using the remote controller to provide desired control of the operations of the UAV and/or one or more loads carried by the UAV. As will be described in further details herein, the remote controller 200 in the multi-hand operation mode can be configured to be held in two hands of a user to provide desired control of the UAV and/or one or more loads carried by the UAV.

The transformable remote controller 200 can have a main body 202, and a first handle 230 and a second handle 240 coupled to the main body 202. The first handle can have a first end 232 and a second end 234 opposite the first end, and a first edge 236 and a second edge 238 extending between the first end 232 and the second end 234. The second handle can have a first end 242 and a second end 244 opposite the first end, and a first edge 246 and a second edge 248 extending between the first end 242 and the second end 244. The first handle and the second handle can be pivotally coupled to the main body, for example at or proximate to the respective first ends of the first and second handles, such that the first handle and the second handle can be rotatable relative to the main body to transform the transformable remote controller between the single-hand operation mode and the multi-hand operation mode. The first handle and the second handle can be rotated away from or towards the main body such that the second ends 234, 244 are moved away from or towards the main body. As shown in FIG. 3, the first handle and the second handle can be in a retracted configuration in the single-hand operation mode. For example, the first handle is rotated towards the main body such that the first edge 236 is in contact with the main body, and the second handle is rotated towards the main body such that the first edge 246 is in contact with the main body.

The main body 202 of the transformable remote controller 200 can comprise a first surface 204, a second surface 206 and a lateral surface 208. The first surface can be configured to be oriented towards a user and the second surface can be configured to be oriented away from the user when the user is operating the transformable remote controller. The second surface 206 can comprise a grip protrusion 220 extending therefrom configure to facilitate holding of the remote controller. The main body may comprise one or more input component configured to receive user input for controlling the UAV and/or one or more loads carried by the UAV. The main body can comprise a first joystick 212 and a second joystick 214 extending from the first surface. The first and second joysticks can be symmetrically or substantially symmetrically disposed on the first surface, for example at symmetrical or substantially symmetrical positions on a left portion and a right portion of the first surface. The transformable remote controller can comprise a first toggle switch 216 and a second toggle switch 218 extending from the first surface. In some embodiments, the first and second toggle switches can be symmetrically or substantially symmetrically disposed on the first surface, for example at symmetrical positions or substantially symmetrical positions on a left portion and a right portion of the first surface. One or more of the first joystick, second joystick, first toggle switch, and second toggle switch can be configured to receive user input for controlled operation of the UAV and/or one or more loads carried by the UAV. In some embodiments, the main body can comprise one or more input components for powering on or off the remote controller, the UAV and/or the one or more loads, instruct the UAV to break, instruct the UAV to return to a home destination, and/or initiate image capture and/or video filming. The one or more input components can be configured to provide instructions for one or more other control functions.

The transformable remote controller 200 can comprise a pair of antennas 210. The pair of antennas 210 can be coupled to the main body 202, such as along a portion of the lateral side 208 of the main body. The pair of antennas may be coupled to the main body at one end such that each of the pair of antennas can be rotated relative to the main body. The pair of antennas may be rotated away from the main body to facilitate transmission of signals between the transformable remote controller and the UAV and/or one or more loads carried by the UAV.

The transformable remote controller 200 in the single-hand operation mode can have a shape configured for ease of holding in one hand. For example, the transformable remote controller can have an elongate shape. The first handle 230 and the second handle 240 can be oriented towards the main body 202, such that the first edges 236, 238 of the first handle and second handle are positioned proximate to or in contact with the main body. The pair of antennas 210 can be in a retracted configuration in the single-hand orientation, for example folded against the main body. In some embodiments, the transformable remote controller can be held by a user in a vertical orientation in the single-hand operation mode. For example, a user's hand can grip the transformable remote controller such that the user's hand is in contact with the second surface 208, and one or more of the second edges 238, 248 of the first handle and second handle, and the folded pair of antennas. The first joystick 212 can be above or below the second joystick 214, and the first toggle switch 216 can be above or below the second toggle switch 218 while the transformable remote controller is gripped by a user in the single-hand operation mode. The grip protrusion 220 extending from the second surface can be configured to facilitate gripping of the remote controller in the single-hand operation mode.

Figure 4:
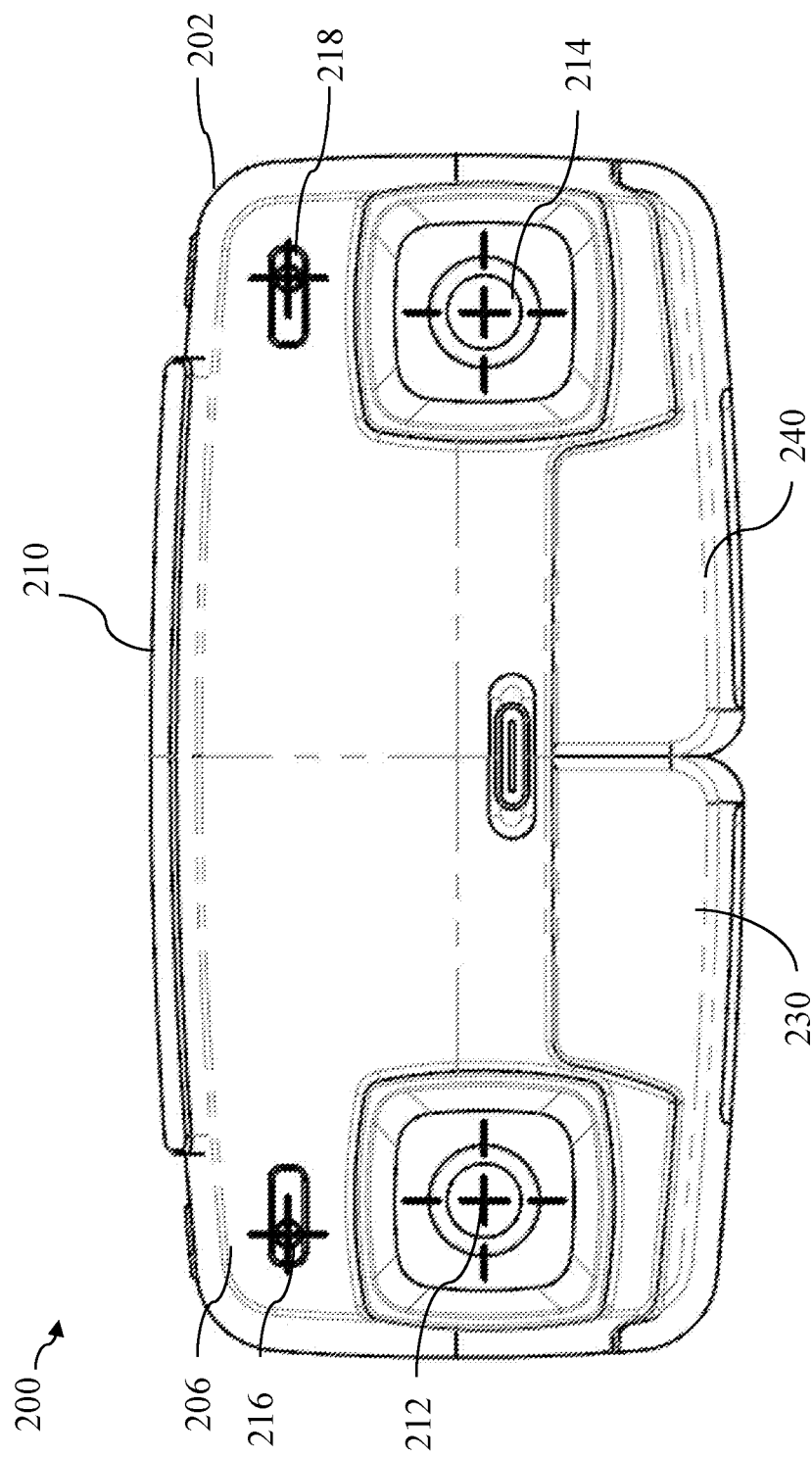
FIG. 4 is a front view of the transformable remote controller of FIG. 3.

FIG. 4 is a front view of the transformable remote controller 200, for example showing the first surface 206 of the main body 202 of the transformable remote controller. In the front view, the first joystick 212, second joystick 214, first toggle switch 216 and second toggle switch 218 are shown disposed on the first surface. Referring to FIG. 4, the first joystick and the first toggle switch can be disposed on a left portion of the first surface while the second joystick and the second toggle switch can be disposed on a right portion of the first surface. In some embodiments, the first joystick and the first toggle switch, and the second joystick and the second toggle switch can be symmetrically or substantially symmetrically disposed relative to a medial plane bisecting the transformable remote controller along a direction perpendicular or substantially perpendicular to a longitudinal axis of the transformable remote controller, respectively.

Figure 5:
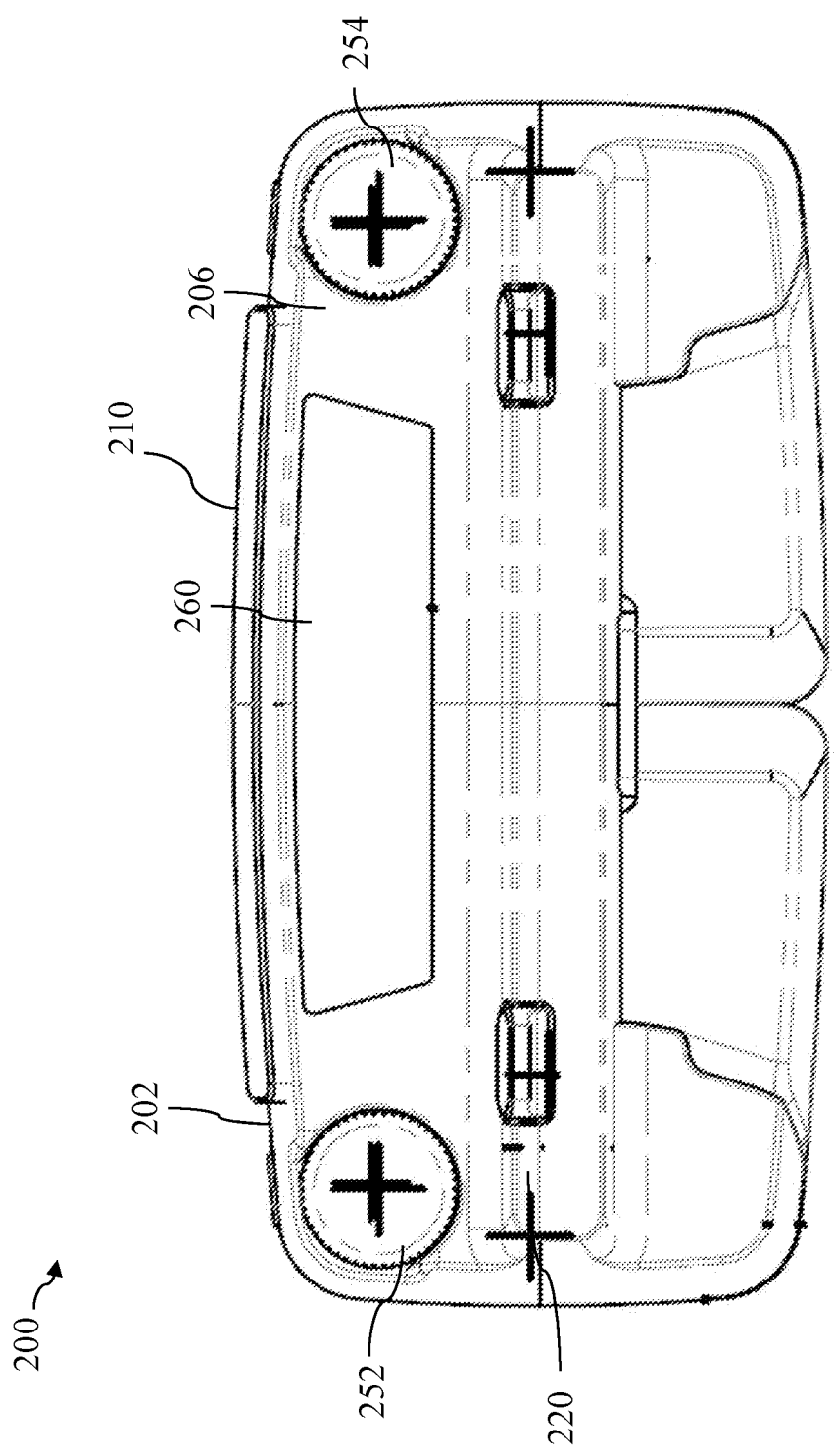
FIG. 5 is a back view of the transformable remote controller of FIG. 3.

FIG. 5 is a back view of the transformable remote controller 200, for example showing the second surface 206 of the main body 202. As described herein, the second surface 220 can comprise the grip protrusion 220 extending therefrom. As shown in FIG. 5, the second surface 206 can comprise a first control wheel 252 and a second control wheel 254. The first control wheel and the second control wheel can be disposed proximate to or at one or more edges of the second surface. As shown in FIG. 5, the first control wheel and the second control wheel can be disposed at opposing corners of the second surface proximate to the portion of the main body coupled to the pair of antennas 210. The first control wheel and the second control wheel can be configured to receive user input for controlling one or more parameters of the UAV and/or the one or more loads carried by the UAV. In some embodiments, one or both of the first control wheel and the second control wheel can be used to control operation of a payload, such as a camera. For example, the first control wheel and/or the second control wheel can be configured to control one or more of a zoom, aperture, and/or shutter speed of the camera. The first control wheel and/or the second control wheel can be configured to receive input for tuning focus, depth of field and/or viewing angle of the camera.

Referring to FIG. 5, the second surface 206 of the main body 202 may comprise a tactile sensor 260 disposed thereon. For example, the tactile sensor 260 may comprise a capacitive touchscreen configured to detect contact between the user and the capacitive touchscreen. The tactile sensor may be configured to detect one or more of the presence of contact, extent of contact, shape of contact and force of contact between the user's hand and the tactile sensor. As will be described in further details herein, information detected by the tactile sensor can be used for triggering transformation of the transformable remote controller 200 between the single-hand and multi-hand operation modes. The tactile sensor may be sized and/or shaped for desired detection of contact between the user and the tactile sensor. FIG. 5 shows the tactile sensor disposed on the second surface proximate to and centered along an edge of the second surface adjacent to the pair of antennas 210. It will be understood that the tactile sensor can be positioned elsewhere on the second surface convenient for desired detecting of contact between the user and the tactile sensor.

Figure 6:
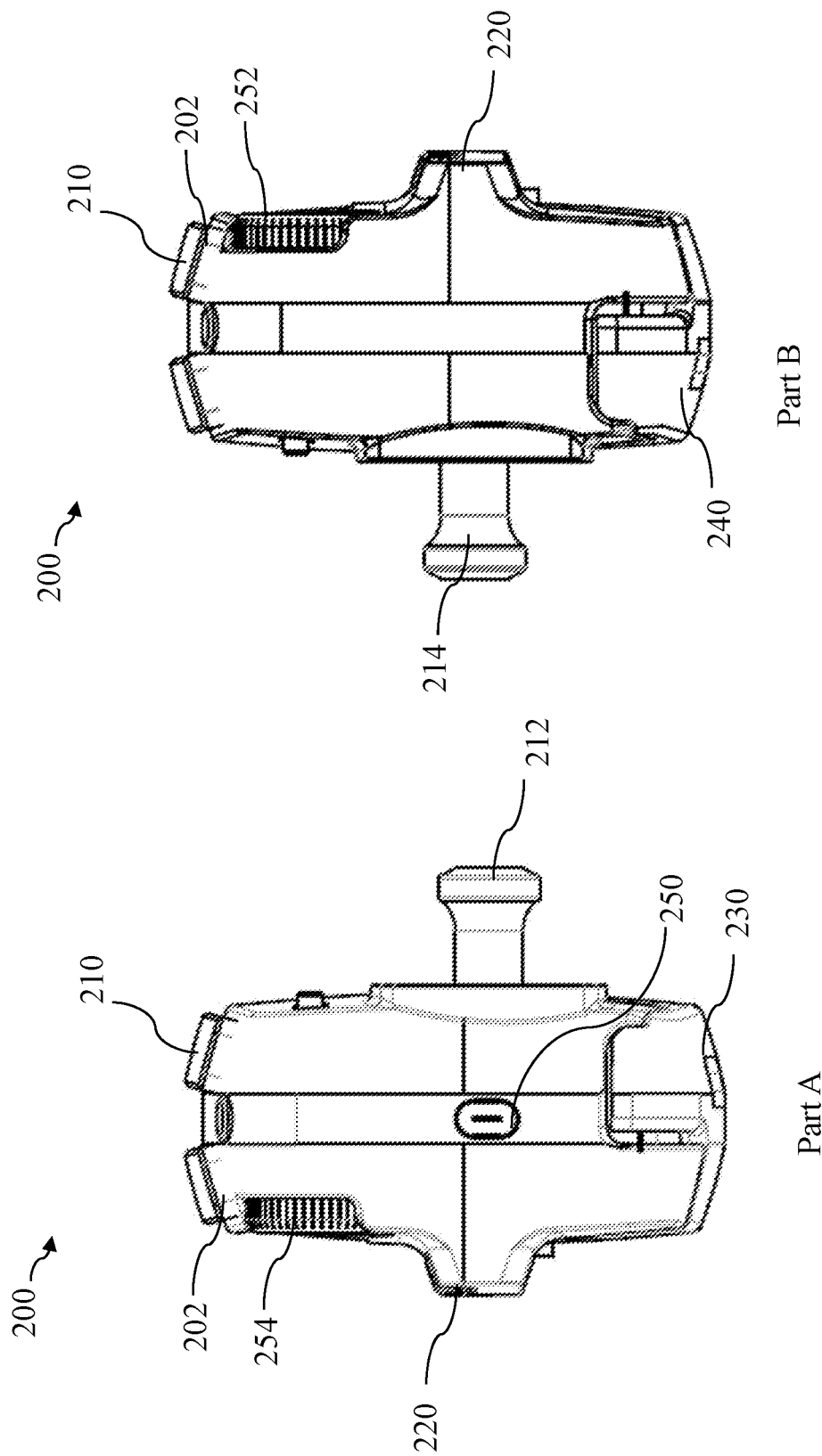
FIG. 6 shows left-side and right-side views of the transformable remote controller of FIG. 3.

FIG. 6 shows side views of the transformable remote controller 200. Part A of FIG. 6 shows a first side view, such as a left side view, and Part B shows a second side view, such as a right side view. In the first side view, a transformation user input component 250 is shown. The transformation user input component may comprise a variety of configurations. In some embodiments, the transformation input component can comprise a push button. For example, the user can press the push button to initiate transformation of the transformable remote controller between the single-hand and multi-hand operation modes. The transformation input component may comprise other configurations, including one or more of a toggle switch, a sensor (e.g., tactile touchscreen, audio sensor, image sensor). For example, the transformation input component may comprise a voice recognition component configured to receive user voice instructions for triggering transformation. In some embodiments, the transformation input component can be configured to trigger transformation based on a detected image, and/or a detected extent, shape and/or degree of force of contact between the user and the transformation input component.

In some embodiments, the transformation input component 250 can be configured to enable a user to select left-hand or right-hand operation when in the single-hand operation mode. In some embodiments, the transformation input component can be configured to enable the user to select between a single-hand operation mode and a multi-hand operation mode, as well as a selection between left-hand or right-hand operation. As described herein, the transformation input component can comprise one or more of a push button, a toggle switch, and a sensor (e.g., tactile touchscreen, audio sensor, image sensor). For example, the transformation input component can enable the user to toggle between the left-hand and right-hand operation modes, and/or between single and multi-hand operation modes. In some embodiments, a sequence and/or number times the user presses a push button can used to change between the left-hand and right-hand operation modes, and/or the single and multi-hand operation modes. In some embodiments, information detected by one or more sensors can be used to trigger change between the left-hand and right-hand operation modes, and/or the single and multi-hand operation modes. For example, one or more of user voice instructions, detected image, and a detected extent, shape and/or degree of force of contact between the user and the transformation input component can be used to trigger change between the left-hand and right-hand operation modes, and/or the single and multi-hand operation modes.

In some embodiments, the change between left-hand and right-hand operation can comprise changing a functionality of one or more input components of the transformable remote controller. For example, user interaction receive at an input component while in the left-hand operation mode can result in generation of an instruction signal different from that generated when user interaction is received at the same input component while in the right-hand operation mode. In some embodiments, a change between left-hand and right-hand operation can trigger change in functionality of one or more input components. In some embodiments, a change between left-hand and right-hand operation can trigger inactivation of one or more input components. The functionality change and/or inactivation of the one or more input components when changing between the left-hand and right-hand operation can be predetermined based on desired control of either or both of the UAV and one or more loads carried by the UAV, and the pattern of grip a user's hand would have on the transformable remote controller.

Figure 7:
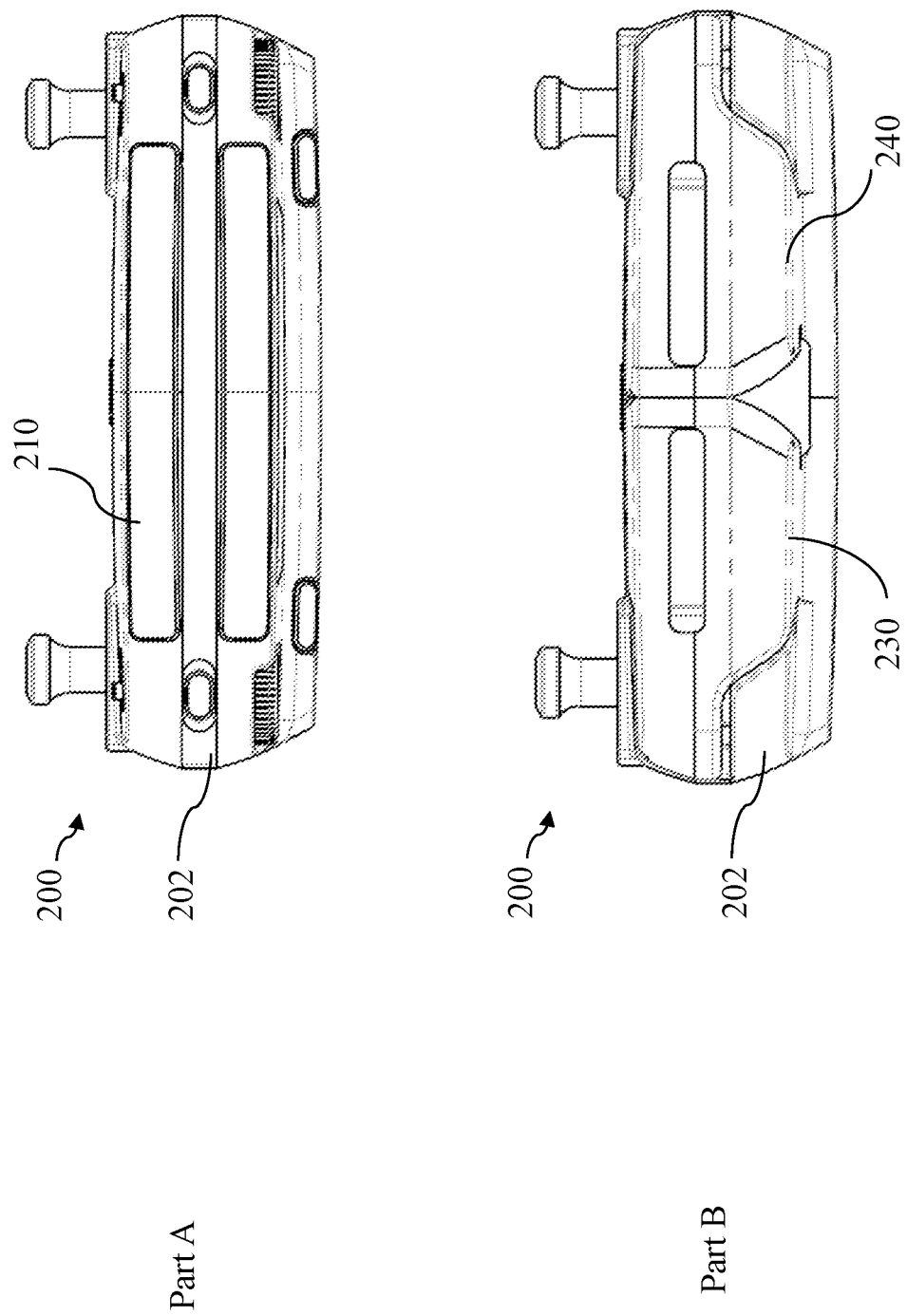
FIG. 7 shows top-side and bottom-side views of the transformable remote controller of FIG. 3.

Referring to FIG. 7, different side views of the transformable remote controller 200 are shown. In Part A, a third side view, such as a top side view is shown, while Part B shows a fourth side view, such as a bottom side view. In Part A of FIG. 7, for example, the pair of antennas 210 are shown. In Part B of FIG. 7, for example, the first handle 230 and the second handle 240 are shown.

In the single-hand operation mode, a user can use the thumb and/or one or more other finger of the hand holding the transformable remote controller 200 to provide input to the remote controller for controlling operation of the UAV and/or one or more loads carried by the UAV. For example, the user can use the thumb to manipulate one or more of the first joystick 212, second joystick 214, first toggle switch 216 and second toggle switch 218. In some embodiments, one or more other fingers of the user can interact with one or both of the first control wheel 252 and the second control wheel 254. For example, the user can hold the transformable remote controller in the right hand or the left hand. In some embodiments, the user does not interact with all of the user input components in the single-hand operation mode to provide continued control of the UAV and/or the one or more loads. For example, the user may not interact with some user input components while using the transformable remote controller in the single-hand operation mode that the user may otherwise interact with in a multi-hand operation mode. In some embodiments, the user may interact with only user components on a portion of the transformable remote controller, such as an upper portion, a lower portion, a right portion or a left portion. In some embodiments, the user may interact with only user components on an upper portion, a lower portion, a right portion or a left portion of the first surface 206 and/or the second surface 208. For example, the user may only interact with one of the joysticks and/or one of the toggle switches to provide input in the single-hand operation mode. For example, the user may interact with the first joystick and the first toggle switch, and not the second joystick and second toggle switch, or vice versa. In some embodiments, the user may only interact with the first joystick and the first toggle switch, and either the first control wheel or the second control wheel to provide on-going control of the UAV and/or the one or more loads. In some embodiments, the user may only interact with the second joystick and the second toggle switch, and either the first control wheel or the second control wheel to provide on-going control of the UAV and/or the one or more loads. The user input components the user interacts with in the single-hand operation mode can comprise the user input components within reach of the thumb and/or one or more other fingers of the hand holding the transformable remote controller.

In some embodiments, the transformable remote controller 200 can comprise one or more input components which are inactive in the single-hand operation mode. These input components can be active when the transformable remote controller is in the multi-hand operation mode. User interaction received at the one or more inactive input components can be disregarded while the transformable remote controller is in the single-hand operation mode such that the user interaction is ignored and not converted to an instruction signal for controlling the UAV and/or a load carried by the UAV. In some embodiments, the one or more inactive input components can be disabled in the single-hand operation mode. For example, interaction with the disabled input component may not generate any input signals. User interaction detected at the first joystick 212 and/or the first toggle switch 216 can be converted to instruction signals, while user interaction with the second joystick 214 and/or second toggle switch 218 does not result in instruction signals being transmitted to the UAV and/or the one or more loads carried by the UAV, or vice versa. In some embodiments, one or more of the first joystick, second joystick, first toggle switch and second toggle switch are disabled. For example, in the single-hand operation mode, the first joystick and/or the first toggle switch may be disabled, while the second joystick and/or the second toggle switch can be actively receiving user input, or vice versa. In some embodiments, either the first control wheel 252 or the second control wheel 254 is inactive in the single-hand configuration. For example, the first joystick and/or the first toggle switch may be disabled, while the second joystick and/or the second toggle switch can be actively receiving user input, or vice versa, and either the first control wheel or the second control wheel is disabled.

In some embodiments, in the single-hand operation mode, the transformable remote controller 200 can be configured to receive instructions from the user to provide continued dynamic control of either the UAV or one or more loads carried by the UAV. In some embodiments, the transformable remote controller can be configured to enable continued control of either the UAV or one or more loads carried by the UAV, while the other of the UAV or the one or more loads operates autonomously or semi-autonomously. For example, a user input component of the transformable remote controller can be configured to receive one or more initial setting selections for the UAV or the payload and/or payload carrier (e.g., gimbal), and the UAV or the payload and/or carrier can subsequently operate based on the one or more initial settings without further user intervention, while the transformable remote controller can be configured to receive continued input for dynamically controlling the other of the UAV or the payload and/or payload carrier. In some embodiments, the UAV or the payload and/or carrier can operate autonomously, such as after initiation and/or powering on without further user intervention, while the transformable remote controller can be configured to receive continued input for dynamically controlling the other of the UAV or the payload and/or payload carrier. In some embodiments, the transformable remote controller in the single-hand operation mode can be configured to control both operation of the UAV and one or more loads carried by the UAV.

In some embodiments, one or more input components of the transformable remote controller 200 can be configured to receive user input for continued control of the UAV by the user, such as to control a flight path, and/or orientation of the UAV. The one or more input components can be configured to provide continued control of one or more parameters relating to a hovering state of the UAV, such as a height of the UAV relative to ground, and/or a distance and/or position relative to a target subject. In some embodiments, the one or more input components can be configured to receive input for setting a distance and/or orientation of the UAV relative to the transformable remote controller. For example, movement of the first joystick 212 or the second joystick 214 along a first direction can be configured to set a distance of the UAV away from the remote controller, while movement of the first joystick or a second joystick along a second direction perpendicular or substantially perpendicular to the first direction can be configured to set a phase angle of the UAV relative to the transformable remote controller. The phase angle may comprise at least one of a pitch, yaw, or roll angle of the UAV.

In some embodiments, one or more input components of the transformable remote controller 200 can be configured to receive user input for continued control by the user of a load carried by the UAV. The one or more input components can be configured to receive input for one or more parameter settings relating to the operation of a payload, such as an image capturing device. In some embodiments, image capturing device (e.g., taking still or moving pictures, zooming in or out, turning on or off, switching imaging modes, change image resolution, changing focus, changing depth of field, changing exposure time, changing viewing angle or field of view). In some embodiments, the one or more input components can be configured to receive input for a shutter setting of the camera.

In some embodiments, the transformable remote controller 200 comprises one or more sensor components configured to provide information for controlling operation of the UAV or one or more loads carried by the UAV in the single-hand operation mode. In some embodiments, the transformable remote controller comprises a motion sensor configured to provide information for controlling operation of the UAV or one or more loads carried by the UAV in the single-hand operation mode. In some embodiments, the one or more motion sensors comprises an inertial measurement unit (IMU). In some embodiments, the one or more motion sensors comprises at least one of an inertial sensor or a magnetometer. In some embodiments, the motion sensor can be configured to provide information to control orientation of one or more loads, including a payload and/or a payload carrier. One or more user input components of the transformable remote controller can be configured to provide continued control of the UAV while control of the payload and/or payload carrier is based on the information detected by the motion sensor. For example, one or more motion sensors can be configured to detect motion of a target subject such that the one or more loads can be configured to be oriented towards the target subject during operation of the one or more loads. A lens of an image capture device, such as a camera, can be configured to maintain the target subject within its field of view, such as being centered in its field of view, based on the detected motion of the target subject using the motion sensor such that desired images can be captured while the UAV is in flight, such as when the UAV is hovering around and/or near the target subject. For example, orientation of the lens relative to one or more of a pitch axis, roll axis and yaw axis of the UAV can be adjusted in real-time based on information detected by the one or more motion sensors.

Alternatively, or in combination, the one or more motion sensors can be configured to control a flight path and/or orientation of the UAV, including one or more of a pitch angle, roll angle and yaw angle. For example, one or more of a pitch angle, roll angle and yaw angle can be adjusted in real-time based on information detected by the one or more motion sensors. In some embodiments, the orientation and/or the flight path of the UAV can be adjusted to maintain a target subject in the field of view of a payload carried by the UAV.

In some embodiments, the one or more sensor components comprise a Global Positioning System unit (GPS). In some embodiments, the GPS can be configured to provide information to control a load carried by the UAV, such as an orientation of the load. The load can be configured to oriented towards the transformable remote controller based on information provided by the GPS relating to the location of the remote controller. For example, one or more input components of the transformable remote controller 200 can be configured to receive input for controlling operation of the UAV, and/or one or more other settings of the load. As described herein, the load may be an imaging device. The one or more input components can be configured to enable continued user control of when to capture an image, zooming in or out, turning on or off, switching imaging modes, change image resolution, changing focus, changing depth of field, changing exposure time, and/or changing viewing angle or field of view.

In some embodiments, one or more loads carried by the UAV can be controlled based on information detected by an image sensor. For example, the one or more loads can be controlled based on information detected by an image capture device carried by the UAV. The one or more loads can be configured to maintain a target subject within a field of the load based on images detected by the image capture device (e.g., intelligent vision), for example to adjust an orientation of the load in response to the image information, such that one or more input components of the transformable remote controller is configured to receive input to control operation of the UAV and/or one or more other parameters of the load.

Figure 8:
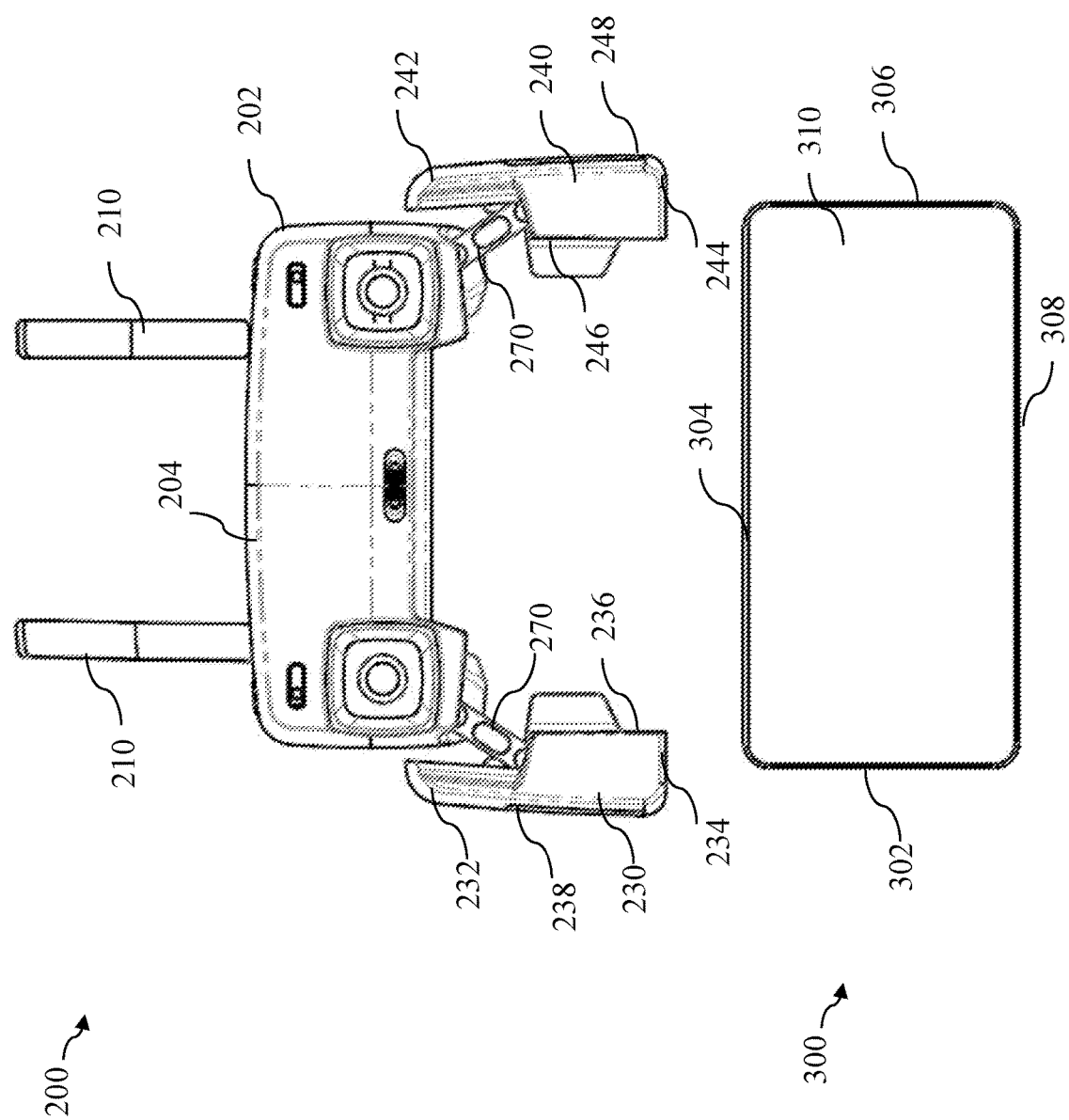
FIG. 8 is a front view of the transformable remote controller of FIG. 3 in a multi-hand operation mode, and an auxiliary controller module configured to be coupled to the transformable remote controller in the multi-hand operation mode.

FIGS. 8-11 are schematic diagrams of the transformable remote controller 200 in a multi-hand operation mode. In FIG. 8, a front view of the transformable remote controller and an auxiliary controller module 300 are shown. As shown in FIG. 8, transforming between the single-hand operation mode and the multi-hand operation mode can comprise a physical transformation of the transformable remote controller. In the multi-hand operation mode, the first handle 230 and the second handle 240 can be rotated away from the main body 202 of the transformable remote controller. For example, the first handle and the second handle are positioned such that respective second ends 234, 244 of the first handle and second handle are away from the main body. The first handle and the second handle can engage in rotation relative to the main body such that the first handle and the second handle are at desired positions and/or orientations relative to the main body. In some embodiments, the first handle and the second handle can be configured to engage only in rotation relative to the main body to position and/or orient the first handle and the second handle relative to the main body. For example, the first handle and the second handle can be configured to rotate within a horizontal plane to effect the physical transformation, all portions of the first handle and second handle remaining within the same horizontal plane throughout the transformation. In some embodiments, the first handle and the second handle can each be rotated such that the first handle and the second handle are positioned at an angle of up to about 80°, about 85°, about 90° or about 95°, relative to the main body. For example, the first handle and the second handle can each be rotated such that the first edges 236, 246 and the second edges 238, 248 are positioned at an angle of up to about 80°, about 85°, about 90° or about 95°, relative to the main body.

In some embodiments, the first handle and the second handle can be configured to engage in both rotation and translation relative to the main body to position and/or orient the first handle and the second handle relative to the main body. For example, the first handle and the second handle can both rotate away from and translate away from the main body during the transformation from the single-hand operation mode to the multi-hand operation mode. The first handle and the second handle can rotate and translate relative to the main body such that respective second ends 234, 244 of the first handle and second handle are positioned at desired positions relative to the main body. Conversely, the first handle and the second handle can both rotate towards and translate towards the main body during the transformation from the multi-hand operation mode to the single-hand operation mode. As shown in FIG. 8, the first handle and the second handle can be coupled to the main body via respective linkage components 270. The linkage components can be configured to enable rotation and/or translation of the first handle and the second handle relative to the main body. In some embodiments, the first handle and the second handle can translate and/or rotate within a horizontal plane during the transformation such that all portions of the first handle and second handle remain in the same plane throughout the transformation. In some embodiments, the transformation comprises vertical translation of the first handle and/or the second handle such that the first handle and/or the second handle are vertically displaced from an initial position prior to the transformation. For example, a portion of or all of the first handle and the second handle may be lowered or raised relative to the main body during the transformation.

The auxiliary module can be coupled to the first handle and the second handle. For example, the auxiliary module can be received between the first handle and the second handle. The footprint of the transformable remote controller in the multi-hand operation mode may be larger than that in the single-hand operation mode, such as up to about 50%, about 40%, about 30%, about 20%, about 10% or about 5% larger. In some embodiments, a footprint of the transformable remote controller and the auxiliary controller module coupled to the transformable remote controller can be up to about 150%, about 100%, about 90%, about 80%, about 70%, about 60%, or about 50% larger than that of the transformable remote controller in the single-hand operation mode. In some embodiments, a length of the assembly comprising the transformable remote controller coupled to the auxiliary controller module extending between an edge of the transformable remote controller and an edge of the auxiliary controller module opposite the edge of the transformable remote controller can be up to about 150%, about 100%, about 90%, about 80%, about 70%, about 60%, or about 50% longer than a length of the transformable remote controller extending between the edge of the transformable remote controller and an opposing lateral edge of the transformable remote controller in the single-hand operation mode.

The auxiliary controller module 300 can have a first lateral edge 302, a second lateral edge 304, a third lateral edge 306 and a fourth lateral edge 308. The first lateral edge can be opposite the third lateral edge such that one or both of the first and third lateral edges can be in contact with corresponding first edges 236, 246 of the first handle 230 and the second handle 240 when the auxiliary controller module 300 is positioned between the first handle and the second handle. The auxiliary controller module can comprise a first surface 310, such as a front surface configured to be oriented towards a user when coupled to the transformable remote controller and used by the user to control the UAV and/or one or more loads carried by the UAV. The first surface may comprise a visual display configured to display to the user one or more parameters of the UAV and/or the one or more loads. In some embodiments, the first surface comprises one or more user input components for receiving user input to control the UAV and/or one or more loads. The one or more user input components may comprise a graphical user interface. For example, the visual display may comprise the graphical user interface, the visual display being configured to both display information to the user and receive user input.

The auxiliary controller module 300 can comprise one or more of any number of mobile electronic user devices. The auxiliary controller module can comprise a handheld mobile electronic user device which can be mounted onto the transformable remote controller 100 to enable desired interaction between the user and the UAV and/or one or more loads carried by the UAV while the transformable remote controller is in the multi-hand operation mode. The auxiliary controller module can be any number of mobile electronic device comprising functions described herein to enable the desired interaction. In some embodiments, the auxiliary controller module can be a handheld personal computer. In some embodiments, the auxiliary controller can be a mobile phone. In some embodiments, the auxiliary controller module can be an electronic mobile tablet. In some embodiments, the auxiliary controller module can be a personal digital assistant.

Figure 9:
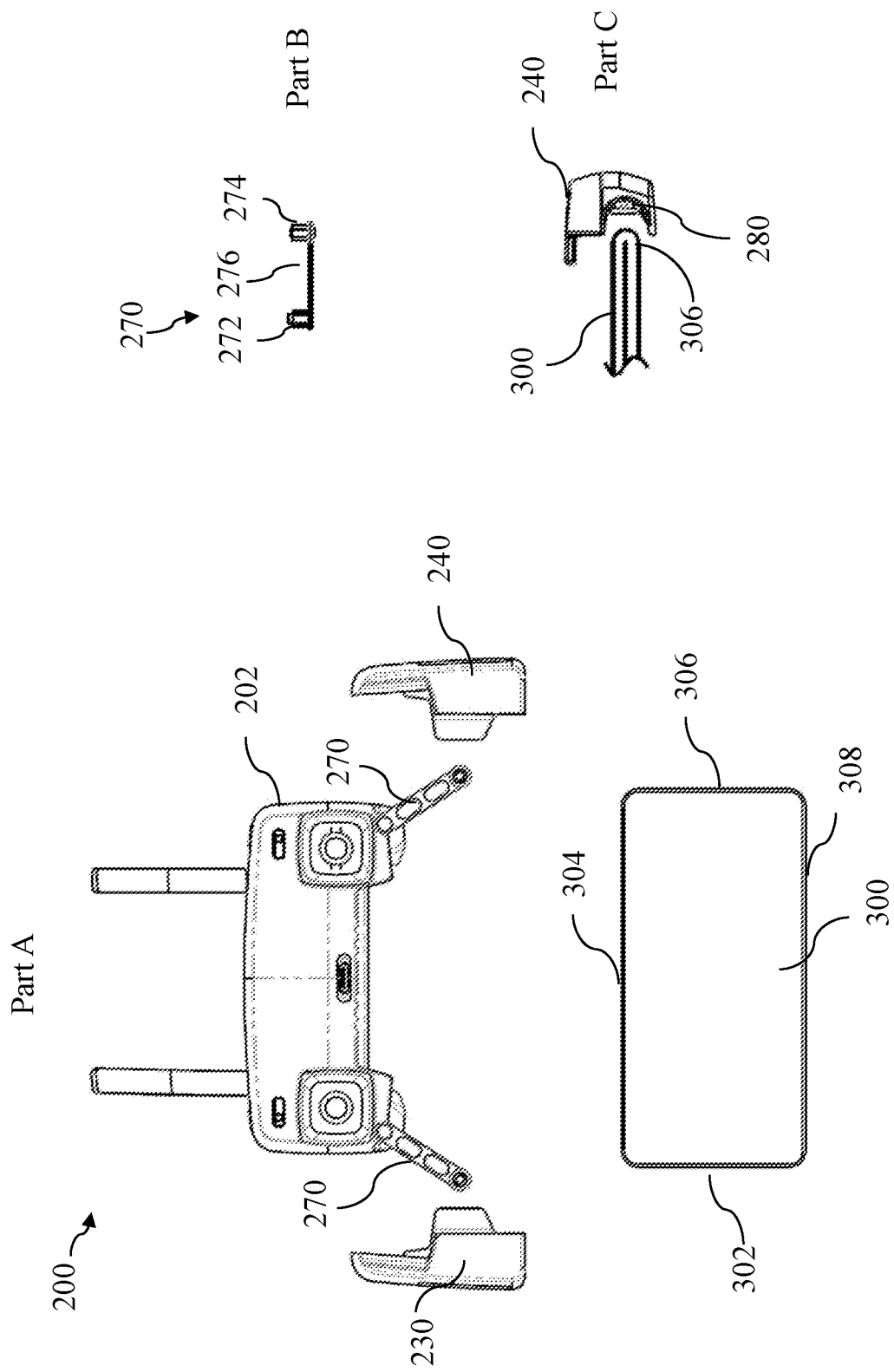
FIG. 9 shows an exploded view of the transformable remote controller of FIG. 8, and a side view of a linkage component and a side view of a portion of the auxiliary controller module received in a corresponding portion of the transformable remote controller.

In Part A of FIG. 9 an exploded view of the transformable remote controller 200 in the multi-hand configuration is shown. As shown in Part A, the first handle 230 and the second handle 240 can be coupled to the main body 202 via respective linkage components 270. In Part B, a side view of a linkage component is shown in greater detail. The linkage component can be configured to couple the first or second handle and the main body, while providing desired support for the auxiliary controller module 300 when the auxiliary controller module is positioned between the first and second handles and/or maintaining the first or second handle in the desired position relative to the main body while support the auxiliary controller module. In some embodiments, the linkage component can have a first end 272 and a second end 274, and two shafts 276 extending between the first end and the second end. In some embodiments, the linkage component can comprise an interference shaft having a constant rotational resistance of about 1 kg-cm to about 5 kg-cm, including about 2 kg-cm to about 5 kg-cm, such as about 3 kg-cm.

In Part C, a portion of the transformable remote controller 200 for coupling to the auxiliary controller module 300 is shown. As described herein one or both of the first handle 230 and the second handle 240 can be configured to be in contact with the auxiliary controller module. One or more of the first handle and the second handle can be configured to support at least a portion of the auxiliary controller module.

For example, a lateral edge of the auxiliary controller module can be received in a corresponding recess of a handle of the transformable remote controller. As shown in Part C of FIG. 9, at least a portion of a third edge 306 of the auxiliary controller module can be received in a corresponding groove 280 along at least a portion of the first edge 246 of the second handle. In some embodiments, the groove comprises an anti-slip material configured to maintain the auxiliary controller module between the first foldable handle and the second foldable handle. For example, the anti-slip material may be on at least a portion of the surface forming the groove configured to be in contact with the auxiliary controller module to facilitate maintaining the auxiliary controller module at a desired position between the first and second handles. In some embodiments, both the first handle and the second handle can be configured to be coupled to the auxiliary controller module. For example, the first handle can comprise a corresponding groove configured to receive and support a first lateral edge 302 of the auxiliary controller module. The auxiliary controller module may be in contact with anti-slip material within the corresponding grooves of the first and second handles such that the auxiliary controller module can be stably maintained between the first and second handles, such as including when the transformable remote controller and the auxiliary controller module are held vertically relative to the ground.

Figure 10:
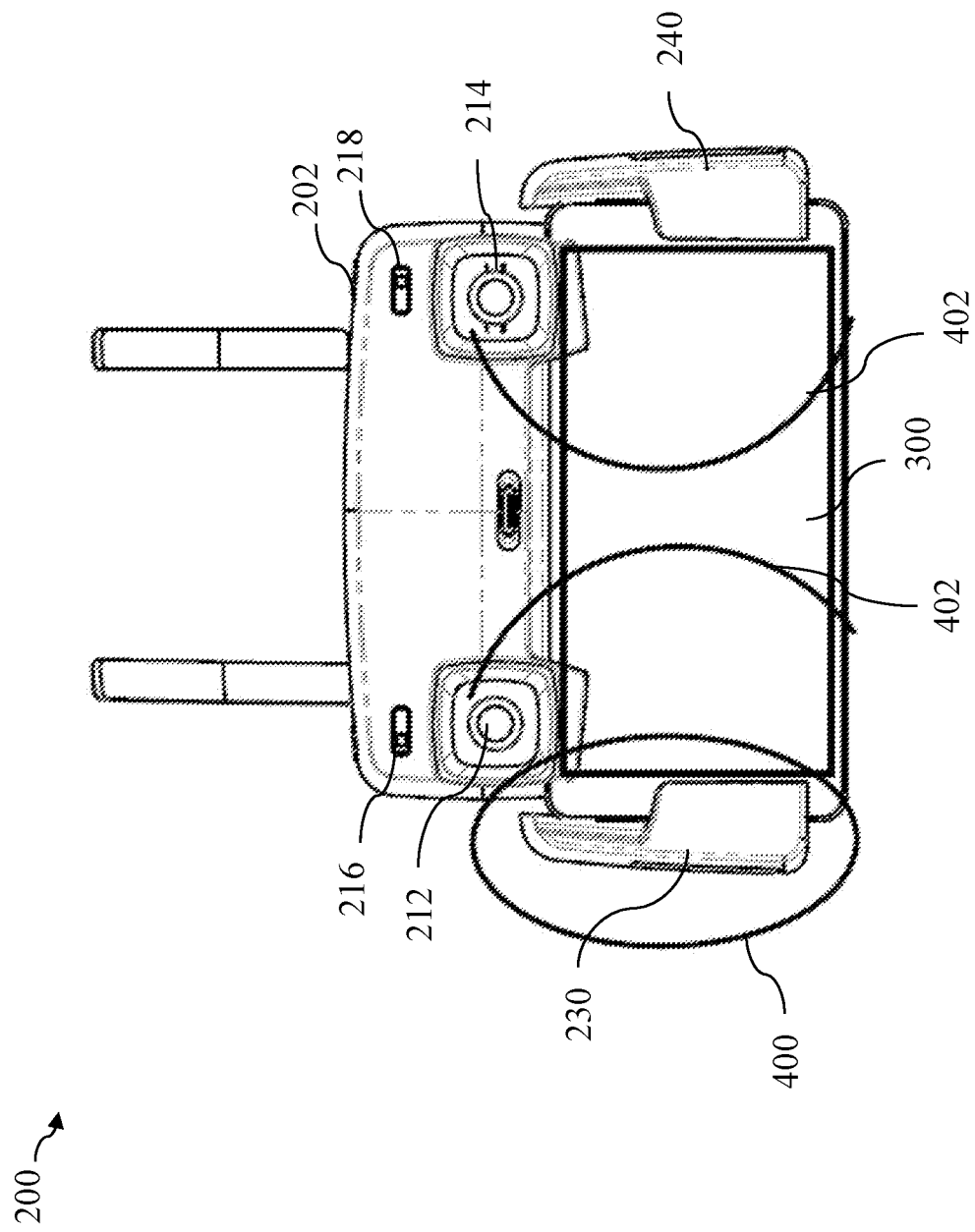
FIG. 10 is a front view of the transformable remote controller coupled to the auxiliary controller module.

In FIG. 10, the auxiliary controller module 300 is shown as being received between the first handle 230 and the second handle 240 of the transformable remote controller 200. A user can hold both the first handle and second handle while operating the transformable in the multi-hand operation mode. For example, as shown by circle 400, the palm of the user's hand can contact the first handle. The user's thumbs can interact both with the auxiliary controller module, and the transformable remote controller, for example as shown by curves 402. In some embodiments, the transformable remote controller can be dimensioned and shaped such that the user can interact, using the user's thumbs, with one or more input components on the first surface 206 of the transformable remote controller, and one or more input components on the first surface 310 of the auxiliary controller module. For example, the user's thumbs can interact both with a graphical user interface on the first surface of the auxiliary controller module, and the first joystick 212 and the second joystick 214 on the first surface of the transformable remote controller. In some embodiments, the transformable remote controller can be dimensioned and shaped such that the user can interact, using the user's thumbs, with most, or all or substantially all, of the graphical user interface disposed on the first surface of the auxiliary controller module, including a graphical user interface which covers all or almost all of the first surface of the auxiliary controller module. In some embodiments, the transformable remote controller can be dimensioned and shaped such that the user can interact, using the user's thumbs, with most, or all or substantially all, of the graphical user interface disposed on the first surface of the auxiliary controller module, including a graphical user interface which covers all or almost all of the first surface of the auxiliary controller module, the first joystick, the second joystick, the first toggle switch 216 and the second toggle switch 218.

In some embodiments, the user can interact with the graphical user interface disposed on the first surface 310 of the auxiliary controller module using a thumb. For example, the graphical user interface can display to the user a field of view of a payload, such as a camera. In one example, the user can click on a target on the graphical user interface with a thumb, and in response, parameters of imaging parameters of the camera can be adjusted (e.g., a white balance and/or ISO of the camera) based on the clicked target. The orientation of the camera can be adjusted in response to the clicked target such that the target is centered in the field of view of the camera. The user can touch the graphical user interface with two thumbs to achieve other control features, such as to instruct the camera to zoom in or out using relative movement of the two thumbs. In some embodiments, the user can interact with an input component to activate an image capture sequence (e.g., capture one or more photographs and/or film a video), such as after or at the same time as clicking on the graphical user interface to select the target subject. Subsequently, the user can continue to control one or more operations of the UAV, while operation of the camera can be controlled based on the selected target subject and image capture parameters.

Figure 11:
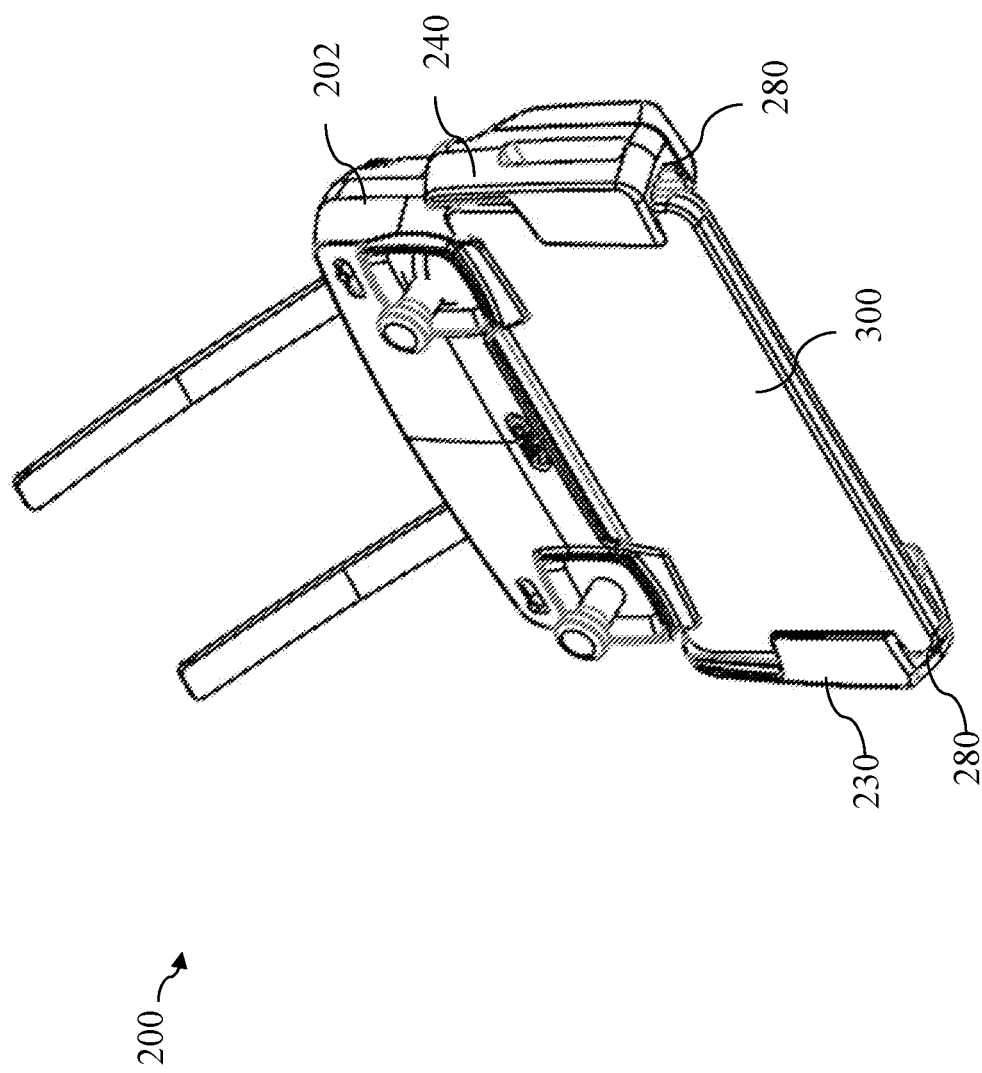
FIG. 11 is a perspective view of the transformable remote controller coupled to the auxiliary controller module.

FIG. 11 is perspective view of the auxiliary controller module 300 coupled to the transformable remote controller 200. FIG. 11 shows more clearly the auxiliary controller module being received within respective grooves 280 of the first handle 230 and the second handle 240 of the transformable remote controller.

In some embodiments, the transformable remote controller 200 comprises one or more sensor components configured to collect information used to trigger transformation of the remote controller between the single-hand operation mode and the multi-hand operation mode. In some embodiments, the transformable remote controller 200 comprises one or more sensor components configured to detect whether the transformable remote controller is in the single-hand operation mode or the multi-hand operation mode, such that one or more other functions can be performed by the transformable remote controller. For example, one or more functions can be performed by the transformable remote controller in response to a detected state of the remote controller.

As described herein, the transformable remote controller 200 can comprise a tactile sensor 260 on a second surface 208. The tactile sensor may comprise a capacitive touchscreen. In some embodiments, one or more of a detected shape, size, and force of contact between the user and the capacitive touchscreen can be used to trigger transformation between the single-hand operation mode and the multi-hand operation mode. For example, the transformable remote controller can be configured to generate an instruction signal for transforming to the single-hand operation mode or the multi-hand operation mode depending on whether a detected shape is the same as or similar to a predetermined contact shape. For example, the remote controller can be configured to select the single-hand operation mode if a similarity between the shape of the detected pattern of contact and a second predetermined shape is equal to or greater than a threshold. In some embodiments, the transformable remote controller can be configured to generate an instruction signal for transforming to the single-hand operation mode or the multi-hand operation mode depending on whether a detected area of contact and/or a force of contact is greater than, or greater than or equal to, a threshold contact area or a threshold contact force, respectively. For example, the transformable remote controller can be configured to generate an instruction signal for transforming to the multi-hand operation mode if a detected contact area is greater or greater than or equal to a threshold contact area. In some embodiments, the transformable remote controller can be configured to generate an instruction signal for transforming to the single-hand operation mode if a detected contact area is smaller than a threshold contact area. In some embodiments, the transformable remote controller can be configured to generate an instruction signal for transforming the remote controller to the multi-hand operation mode if a detected force of contact is smaller than a threshold contact force. In some embodiments, the transformable remote controller can be configured to generate an instruction signal for transforming to the multi-hand operation mode if a detected contact force is greater than or greater than or equal to a threshold contact force. The transformable remote controller can be configured to generate one or more instruction signals based on the detected area of contact, shape of contact and/or force of contact to effect rotational movement of the first handle 230 and the second handle 240 relative to the main body of the transformable remote controller.

In some embodiments, the transformable remote controller 200 comprises a sensor configured to detect whether the transformable remote controller is in the single-hand operation mode or the multi-hand operation mode. As described herein, in some embodiments, the transformation between the single-hand operation mode and the multi-hand operation mode can comprise a physical transformation of the transformable remote controller. In some embodiments, the physical transformation may be manually effected at least in part by the user. In some embodiments, the physical transformation is effected by the transformable remote controller (e.g., in response to user input to initiate transformation). In some embodiments, the transformable remote controller can comprise a position sensor configured to detect position information of the first handle 230 and the second handle 240 relative to the main body 202. The transformable remote controller can be configured to generate instruction signals indicating whether the transformable remote controller is in the single-hand configuration or the multi-hand configuration based on the information provided by the position sensor.

In some embodiments, the position sensor can be disposed on one or more of a portion of the lateral edge 208 of the main body configured to be proximate to or in contact with the auxiliary controller module 300, the first edge 236 of the first handle 230, and the first edge 246 of the second handle 240. The position sensor may be one or more of an angle sensor, contact sensor, proximity sensor. For example, the angle sensor can be configured to detect an angle between one or more of the first handle and the second handle relative to the main body such that the transformable remote controller can generate an instruction signal indicating that the transformable remote controller is in the multi-hand operation mode if the angle between the first handle and/or the second handle and the main body is greater than or greater than or equal to a threshold angle value. In some embodiments, the transformable remote controller can generate an instruction signal indicating that the transformable remote controller is in the single-hand operation mode if the angle between the first handle and/or the second handle and the main body is smaller than a threshold angle value. For example, one or more angle sensors may be disposed on a portion of the lateral edge of the main body which would be proximate to or come into contact with the first edges of first handle and/or the second handle when the first and second handles are in retracted positions such that the angle sensors can detect the angle between the first edges of the first and/or second handles and the portion of the lateral edge of the main body configured to be proximate to or in contact with the first edges when then first and/or second handles are in the retracted positions. In some embodiments, the transformable remote controller can generate an instruction signal indicating that the transformable remote controller is in the single-hand operation mode if the angle between first edges of both the first handle and the second handle and the portion of the lateral edge of the main body is smaller than a threshold angle value.

In some embodiments, the contact sensor can be configured to detect whether a portion of the first handle 230 and/or the second handle 240 is in contact with the main body 202. The contact sensor can be configured to detect whether the first edge 236 of the first handle and/or the first edge 246 of the second handle is in contact with the main body, such as a portion of the lateral edge 208 of the main body. For example, one or more contact sensors may be disposed on a portion of the lateral edge of the main body which would come into contact with the first edges of first handle and/or the second handle when the first and second handles are in a retracted positions. The contact sensors can be activated if the first edges of first handle and/or the second handle are then in contact with the main body. In some embodiments, the contact sensor comprises one or more mechanical switches. For example, one or more mechanical switches can be disposed on a portion of the lateral edge of the main body which would come into contact with the first edges of first handle and/or the second handle when the first and second handles are in a retracted positions, and/or on the first edges of the first and/or second handles, such that the mechanical switch is depressed due to the contact between the first handle and/or second handle and the main body when the first and/or second handles are in the retracted position. In some embodiments, the transformable remote controller is configured to generate an instruction signal indicating that it is in a single-hand operation mode if contact sensors indicate first edges of both the first handle and the second handle are in contact with the main body.

In some embodiments, the proximity sensor can be configured to detect whether the first handle 230 and/or second handle 240 are proximate to the main body 202. One or more proximity sensors may be disposed on a portion of the lateral edge 208 of the main body configured to be positioned proximate to the first edges 236, 246 of first handle and/or the second handle when the first and second handles are in a retracted positions. The one or more proximity sensors can be configured to detect whether one or both of the first edges of the first handle and the second handle are proximate to the portion of the lateral edge of the main body. In some embodiments, the transformable remote controller is configured to generate an instruction signal indicating that it is in a single-hand operation mode if proximity sensors indicate first edges of both the first handle and the second handle are in proximate to the portion of the lateral edge of the main body. In some embodiments, the proximity sensor can be a magnetic position detector.

As described herein, in some embodiments, a functionality of an input component changes with the transformation between single-hand operation mode and multi-hand operation mode. For example, an instruction signal generated based on a user's interaction with the input component while the transformable remote controller is in the single-hand operation mode can be different from an instruction signal generated based on the user's interaction with the same input component in the multi-hand operation mode. For example, input received at an input component while the transformable remote controller is in the single-hand operation mode can be configured for selecting one or more parameters for controlling the UAV, while input received at the same input component while the transformable remote controller is in the multi-hand operation mode can be configured for selecting another parameter for controlling the UAV or one or more parameters for controlling a load carried by the UAV. In some embodiments, an instruction signal triggering a transformation between single-hand operation mode and multi-hand operation mode as described herein can be accompanied by and/or can comprise an instruction to modify the functionality of one or more input components of the transformable remote controller. The instruction can toggle the functionality of the one or more input components between a predetermined functionality for the single-hand operation mode and a predetermined functionality for the multi-hand operation mode. The instruction can comprise a selection of the functionality of the one or more input components based on whether the transformable remote controller is transforming to a single-hand or multi-hand operation mode, for example comprising activating the one or more input components for the functionality. In some embodiments, detection by one or more sensors that a change in configuration of the transformable remote controller has occurred can trigger an instruction signal to change a functionality of the one or more input components.

Figure 12:
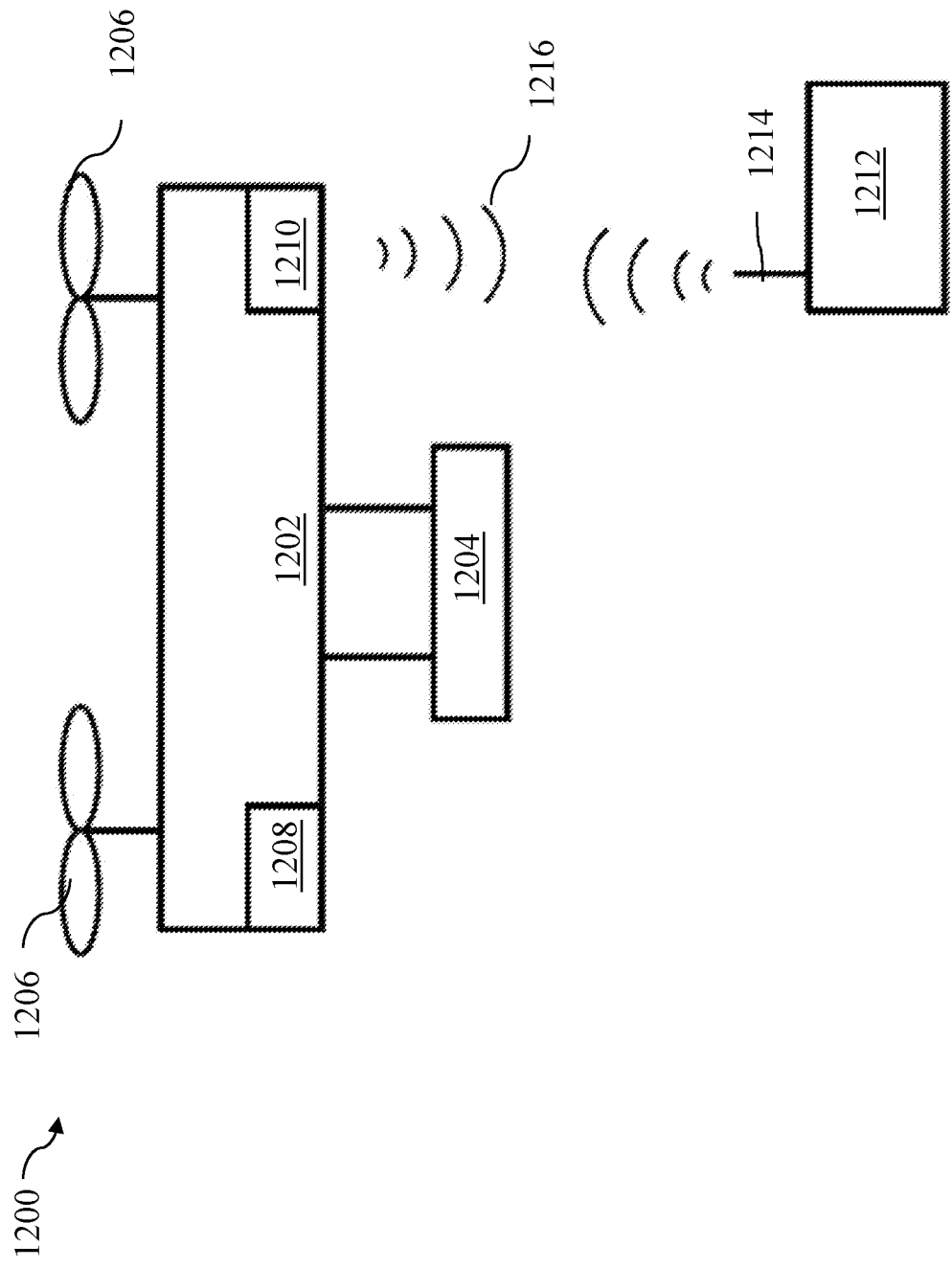
FIG. 12 is a schematic diagram of an example of a movable object including a carrier and a payload.

FIG. 12 illustrates a movable object 1200 including a carrier 1202 and a payload 1204, in accordance with embodiments. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., a UAV), including a UAV as described herein. In some instances, the payload 1204 may be provided on the movable object 1200 without requiring the carrier 1202. The movable object 1200 may include propulsion mechanisms 1206, a sensing system 1208, and a communication system 1210.

The propulsion mechanisms 1206 can include one or more of rotors, propellers, blades, engines, motors, wheels, axles, magnets, or nozzles, as previously described. For example, the propulsion mechanisms 1206 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanism 1200 may be controlled independently of the other propulsion mechanisms. Alternatively, the propulsion mechanisms 1200 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include any of the sensors previously described herein, including GPS sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication, such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1212, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
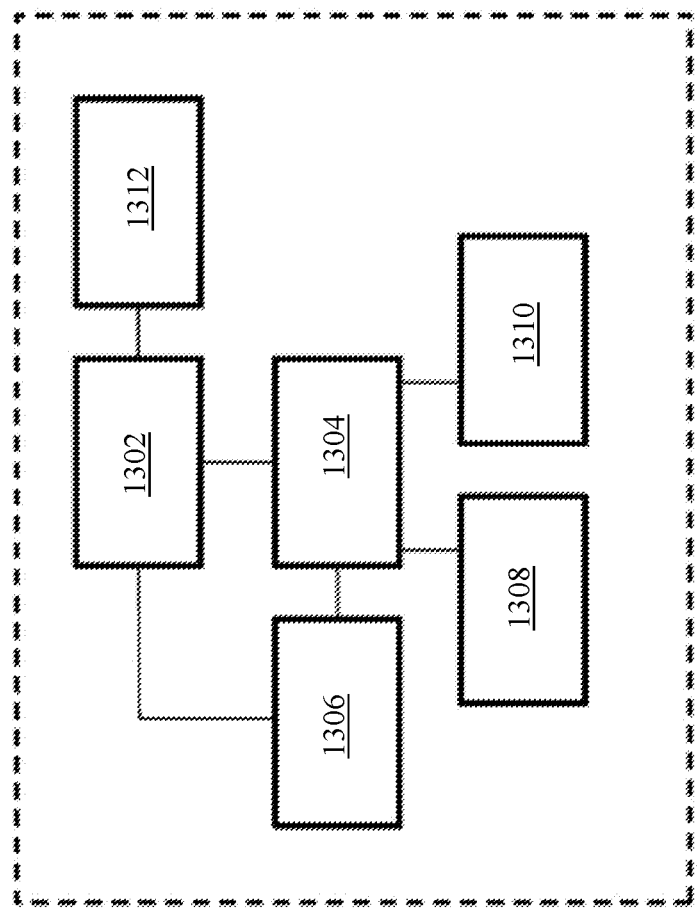
FIG. 13 is a schematic diagram of an example of a system for controlling a movable object.

FIG. 13 is a schematic illustration by way of block diagram of a system 1300 for controlling a movable object, in accordance with embodiments. A movable object may include a UAV as described herein. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable processor (e.g., a central processing unit (CPU)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. For example, the processing unit 1304 can be configured to execute instructions causing one or more processors of the processing unit 1304 to analyze sensing data produced by the sensing module. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 1308 configured to control a state of the movable object. For example, the control module 1308 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system, or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1300 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A remote controller for operating an unmanned aerial vehicle (UAV), comprising:
   a user input component configured to receive user input from a user; and
   a communication circuit configured to transmit an instruction to operate at least one of the UAV or a load carried by the UAV based on the user input,
   wherein the remote controller is configured to receive a transformation input to transform between (1) a single-hand operation mode that enables the user to control an operation of the at least one of the UAV or the load using the user input from a single hand while being held by the single hand, and (2) a multi-hand operation mode that enables the user to control the operation of the at least one of the UAV or the load using at least two hands while holding the remote controller using the at least two hands.

2. The remote controller of claim 1, further comprising a transformation input component configured to receive input to trigger transformation between the single-hand operation mode and the multi-hand operation mode.

3. The remote controller of claim 2, wherein the transformation input component comprises a toggle switch configured to select one of: the multi-hand operation mode, a right-hand operation mode, and a left-hand operation mode, the single-hand operation mode being the right-hand operation mode or the left-hand operation mode.

4. The remote controller of claim 1, wherein in the multi-hand operation mode, the remote controller is configured to receive an auxiliary controller to control the at least one of the UAV or the load carried by the UAV.

5. The remote controller of claim 4, wherein the remote controller is configured to communicate with the auxiliary controller.

6. The remote controller of claim 1, further comprising:
   a main body; and
   a handle coupled to the main body and configured to be in a first configuration in the single-hand operation mode and a second configuration in the multi-hand operation mode.

7. The remote controller of claim 6,
   wherein the handle is a first handle;
   the remote controller further comprising:
      a second handle coupled to the main body and configured to be in the first configuration in the single-hand operation mode and the second configuration in the multi-hand operation mode.

8. The remote controller of claim 7, wherein a position of each of the first handle and the second handle relative to the main body is changeable in a transformation of the remote controller from the single-hand operation mode to the multi-hand operation mode.

9. The remote controller of claim 6, wherein the handle is pivotally coupled to the main body and is configured to extend away from the main body in the second configuration.

10. The remote controller of claim 6, wherein the handle comprises a recess configured to receive the at least a portion of the auxiliary controller.

11. The remote controller of claim 10, wherein the recess comprises an anti-slip material configured to maintain the auxiliary controller at position.

12. The remote controller of claim 6, wherein the foldable handle is configured to fold towards the main body in the first configuration.

13. The remote controller of claim 1, further comprising a position sensor configured to detect whether the remote controller is in the single-hand operation mode or the multi-hand operation mode.

14. The remote controller of claim 13, further comprising:
   a main body; and
   a handle coupled to the main body and configured to be in a first configuration in the single-hand operation mode and a second configuration in the multi-hand operation mode;
   wherein the position sensor is configured to detect a position of the handle relative to main body.

15. The remote controller of claim 14, wherein:
   the handle is configured to rotate away from the main body to transform to the second configuration and rotate towards the main body to transform to the first configuration; and
   the position sensor includes an angle sensor configured to detect an angle of rotation of the handle relative to the main body.

16. The remote controller of claim 13, wherein the position sensor comprises at least one of a contact sensor or a proximity sensor.

17. A method of operating a remote controller of an unmanned aerial vehicle (UAV), comprising:
   receiving a transformation input and transforming the remote controller to operate between (1) a single-hand operation mode that enables a user to achieve a controlled operation of at least one of the UAV or a load carried by the UAV using a user input while holding the remote controller using a single hand, and (2) a multi-hand operation mode that enables the user to use at least two hands to achieve the controlled operation of the at least one of the UAV or the load carried by the UAV;
   receiving the user input at a user input component; and
   transmitting an instruction to operate the at least one of the UAV or the load based on the user input.

18. The method of claim 17, further comprising generating, by a controller module of the remote controller in response to the remote controller transforming between the single-hand operation mode and the multi-hand operation mode, a control signal comprising information relating to a functionality of the user input component.

19. The method of claim 18, wherein the control signal is configured to modify the functionality of the user input component to change the user input received at the user input component between providing an instruction to operate the UAV and providing an instruction to operate the load.

20. The method of claim 17, wherein:
the remote controller comprises:
- a main body; and
- a first handle and a second handle each pivotally coupled to the main body at a first end and a second end, respectively; and transforming the remote controller to operate between the single-hand operation mode and the multi-hand operation mode comprises rotating the first handle and the second handle relative to the main body.

* * * * *